United States Patent
Agiwal et al.

(10) Patent No.: US 11,509,448 B2
(45) Date of Patent: Nov. 22, 2022

(54) METHOD AND APPARATUS OF HANDLING MULTIPLE ACTIVE BWPS

(71) Applicant: SAMSUNG ELECTRONICS CO., LTD., Suwon-si (KR)

(72) Inventors: Anil Agiwal, Suwon-si (KR); Jaehyuk Jang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 35 days.

(21) Appl. No.: 16/725,277

(22) Filed: Dec. 23, 2019

(65) Prior Publication Data
US 2020/0204333 A1    Jun. 25, 2020

Related U.S. Application Data

(60) Provisional application No. 62/783,937, filed on Dec. 21, 2018.

(51) Int. Cl.
  *H04L 5/00* (2006.01)
  *H04W 76/27* (2018.01)
  *H04W 74/08* (2009.01)

(52) U.S. Cl.
  CPC .......... *H04L 5/0098* (2013.01); *H04L 5/0092* (2013.01); *H04W 74/0833* (2013.01); *H04W 76/27* (2018.02)

(58) Field of Classification Search
  CPC .... H04L 5/0098; H04L 5/0092; H04W 76/27; H04W 72/0833
  See application file for complete search history.

(56) References Cited

U.S. PATENT DOCUMENTS

| | | |
|---|---|---|
| 2015/0078261 A1 | 3/2015 | Yu et al. |
| 2016/0302203 A1 | 10/2016 | Liu et al. |
| 2019/0200392 A1 | 6/2019 | Agiwal |
| 2019/0200393 A1 | 6/2019 | Agiwal |
| 2019/0200394 A1 | 6/2019 | Agiwal |
| 2019/0200395 A1 | 6/2019 | Agiwal |
| 2019/0200396 A1 | 6/2019 | Agiwal |

(Continued)

FOREIGN PATENT DOCUMENTS

EP    3 739 934 A1    11/2020

OTHER PUBLICATIONS

3GPP TSG RAN "Medium Access Control (MAC) protocol specification (Release 15)" TS 38.321 V15.3.0, Sep. 25, 2018 (78 pages total).
3GPP TSG RAN "Radio Resource Control (RRC) protocol specification (Release 15)" TS 38.331 V15.3.0, Sep. 26, 2018, (447 pages total).

(Continued)

*Primary Examiner* — Kevin M Cunningham
(74) *Attorney, Agent, or Firm* — Sughrue Mion, PLLC

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as, one or more of: a smart home, a smart building, a smart city, a smart car, a connected car, health care technologies, digital education technologies, smart retail technologies, and security and safety services. A method and apparatus for handling of multiple active bandwidth parts (BWPs) are provided.

20 Claims, 10 Drawing Sheets

(56) References Cited

U.S. PATENT DOCUMENTS

| | | | | |
|---|---|---|---|---|
| 2019/0208548 A1* | 7/2019 | Shih | ................... | H04W 24/10 |
| 2019/0223227 A1* | 7/2019 | Jiang | .................... | H04W 48/16 |
| 2019/0305840 A1* | 10/2019 | Cirik | ................. | H04W 72/042 |
| 2020/0037245 A1* | 1/2020 | Lu | ...................... | H04L 5/0044 |
| 2020/0100170 A1* | 3/2020 | Babaei | ................ | H04W 48/12 |
| 2020/0100311 A1* | 3/2020 | Cirik | ................. | H04W 72/042 |
| 2020/0328867 A1* | 10/2020 | Shi | ...................... | H04L 5/0098 |

OTHER PUBLICATIONS

3GPP TSG RAN "Physical layer procedures for control (Release 15)" TS 38.213 V15.3.0, Oct. 1, 2018 (103 pages total).
International Search Report (PCT/ISA/210), issued by International Searching Authority in corresponding International Application No. PCT/KR2019/0183327, dated Apr. 6, 2020.
"General corrections on TS 38.321", Samsung (Rapporteur), RAN2, 3GPP TSG-RAN WG2 Meeting #101, 38.321, CR 0039, rev 1, Current version: 15.0.0, R2-1803854, Mar. 15, 2018, 59 pages total, XP051509597.
"The impact of BWP configuration and switching", Institute for Information Industry (III), 3GPP TSG-RAN WG2 NR Ad hoc 1801, R2-1800778, Jan. 12, 2018, 5 pages total, XP051386349.
"Discussion on BWP inactivity timer", Huawei, HiSilicon, 3GPP TSG-RAN2#AH-1801, R2-1800189, Jan. 12, 2018, 5 pages total, XP051386067.
"BWP and random access", Ericsson, 3GPP TSG-RAN WG1 91, R1-1721425, Nov. 28, 2017, 3 pages total, XP051363879.
Communication dated Dec. 6, 2021 issued by the European Patent Office in European Application No. 19899215.8.

* cited by examiner

METHOD AND APPARATUS OF HANDLING MULTIPLE ACTIVE BWPS

CROSS-REFERENCE TO RELATED APPLICATION(S)

This application is based on and claims priority under 35 U.S.C. 119 to U.S. Provisional Patent Application No. 62/783,937 filed on Dec. 21, 2018, in the United States Patent and Trademark Office, the disclosure of which are herein incorporated by reference in their entireties.

TECHNICAL FIELD

The present invention relates to a method and apparatus for handling of multiple active bandwidth parts (BWPs).

BACKGROUND ART

To meet the demand for wireless data traffic having increased since deployment of fourth generation (4G) communication systems, efforts have been made to develop an improved fifth generation (5G) or pre-5G communication system. The 5G or pre-5G communication system may also be called a 'Beyond 4G Network' or a 'Post long term evolution (LTE) System'. The 5G wireless communication system may be considered to be implemented not only in lower frequency bands but also in higher frequency (mm-Wave) bands, e.g., 10 GHz to 100 GHz bands, so as to accomplish higher data rates. To mitigate propagation loss of the radio waves and increase the transmission distance, one or more of: beamforming, massive multiple-input multiple-output (MIMO), full dimensional MIMO (FD-MIMO), array antenna, analog beam forming, or large scale antenna techniques are being considered in the design of the 5G wireless communication system. In addition, in 5G communication systems, development for system network improvement is under-way based on one or more of: advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), have also been developed. Filter bank multi-carrier (FBMC), non-orthogonal multiple access (NOMA), and sparse code multiple access (SCMA) as an advanced access technology, have also been developed.

In a similar regard, the Internet, which is a human centered connectivity network where humans generate and consume information, is now evolving to the Internet of Things (IoT) where distributed entities, such as things (e.g., IoT devices, smart devices), exchange and process information without human intervention. The Internet of Everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things (e.g., connected smart devices). In this case, IoT may be applied to a variety of fields including a smart home, a smart building, a smart city, a smart car or smart connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

In recent years several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports not only the voice service, but also data service. The 4G wireless communication system has been developed to provide high-speed data service. However, the 4G wireless communication system currently suffers from lack of resources to meet the growing demand for high-speed data services. Therefore, the 5G wireless communication system is being developed to meet the growing demand of various services with diverse requirements, e.g., high-speed data services, support ultra-reliability and low latency applications.

In addition, the 5G wireless communication system is expected to address different use cases having quite different requirements in terms of one or more of data rate, latency, reliability, mobility, etc. However, it is expected that the design of the air-interface of the 5G wireless communication system would be flexible enough to serve user equipments (UEs) having quite different capabilities depending on the use case and market segment in which the UE caters service to the end customer. Example use cases the 5G wireless communication system is expected to address includes enhanced mobile broadband (eMBB), massive machine type communication (m-MTC), ultra-reliable low latency communication (URLL), etc. The eMBB requirements like tens of Gbps data rate, low latency, high mobility so on, address the market segment representing the conventional wireless broadband subscribers needing internet connectivity everywhere, all the time and on the go. The m-MTC requirements like very high connection density, infrequent data transmission, very long battery life, low mobility address so on, address the market segment representing the Internet of Things (IoT)/Internet of Everything (IoE) envisioning connectivity of billions of devices. The URLL requirements like very low latency, very high reliability and variable mobility and so on and so forth address the market segment representing the Industrial automation application, vehicle-to-vehicle/vehicle-to-infrastructure communication that is foreseen as one of the enablers for autonomous vehicles (e.g., autonomous cars).

TECHNICAL PROBLEM

Aspects of the present disclosure are to address at least the above-mentioned problems and/or disadvantages and to provide at least the advantages described below.

Accordingly, an aspect of the present disclosure is to provide a method and apparatus for handling of multiple active bandwidth parts.

Another aspect of the present disclosure is to provide a method for channel quality measurement and terminal signal transmission based on coexistence between different systems based on cellular communication using licensed shared bands.

SUMMARY

In accordance with an aspect of the present disclosure, a method performed by a terminal in a wireless communication system is provided. The method may comprise determining whether a bandwidth part (BWP) inactivity timer associated with an active downlink (DL) BWP of a serving cell expires; determining whether a switching of the active DL BWP associated with the BWP inactivity timer is required, in a case that the BWP inactivity timer associated with the active DL BWP expires; and switching the active DL BWP to a default DL BWP or initial DL BWP, in case that the switching of the at active DL BWP is required.

In one embodiment, the method further comprise deactivating the active DL BWP associated with the BWP inactivity timer, in case that the switching of the active DL BWP is not required.

In one embodiment, the determining whether the switching of the active DL BWP associated with the BWP inactivity timer is required comprises determining at least om of whether the active DL BWP is only active DL BWP of the serving cell, whether information indicating that switching the active DL BWP based on an expiration of the BWP inactivity timer is received, or whether other active DL BWP of the serving cell for which a BWP inactivity timer is running is exists.

In one embodiment, the switching the active DL BWP comprises switching the active DL BWP to a default DL BWP or initial DL BWP, in case that at least one of the active DL BWP is the only active DL BWP of the serving cell, the information indicating that switching the active DL BWP based on an expiration of the BWP inactivity timer is received, or the other active DL BWP of the serving cell for which a BWP inactivity timer is running is exists.

In one embodiment, the switching the active DL BWP comprises in case that multiple active DL BWPs are associated with the BWP inactivity timer and the BWP inactivity timer expires, deactivating the multiple active DL BWPs associated with the BWP inactivity timer and activating the default DL BWP or the initial DL BWP.

In one embodiment, the method further comprises receiving, from a base station, configuration information of the DL BWP inactivity timer for the active DL BWP using at least one of DL BWP configuration information for the active DL BWP, a list of DL BWP identifiers of DL BWPs associated with the DL BWP inactivity timer, or a bitmap of DL BWPs corresponding to the DL BWPs associated with the DL BWP inactivity timer.

In one embodiment, the method further comprises identifying that at least one of a control signal indicating downlink assignment or uplink grant is received on the active DL BWP associated with the DL BWP inactivity timer, a control signal indicating the downlink assignment is received for the active DL BWP associated with the DL BWP inactivity timer, or a control signal indicating the uplink grant is received for an active uplink (UL) BWP; determining whether there is no ongoing random access procedure associated with at least one of the active DL BWP, the serving cell, or the active UL BWP and the active DL BWP having same BWP identifier of the active UL BWP, or whether the ongoing random access procedure associated with the active DL BWP or the serving cell is successfully completed upon reception of the PDCCH; and starting or restarting the DL BWP inactivity timer associated with the active DL BWP or the serving cell, in case that there is no ongoing random access procedure or the ongoing random access procedure is successfully completed.

In one embodiment, the method further comprises determining whether a physical random access channel (PRACH) occasion is configured for at least one active uplink (UL) BWP of the serving cell; in case that the PRACH occasion is not configured for the at least one active UL BWP of the serving cell, switching a predetermined active UL BWP of the at least one active UL BWP to initial UL BWP; and in case that the serving cell is a special cell (SpCell) and none of at least one active DL BWP is the initial DL BWP, switching a predetermined active DL BWP of the at least one active DL BWP to the initial DL BWP.

In one embodiment, the method further comprises in case that the PRACH occasion is configured for an active UL BWP of the any active UL BWP, selecting the active UL BWP configured with the PRACH occasion for random access preamble transmission; and in case that the serving cell is the SpCell and none of the at least one active DL BWP have a same BWP identifier as the selected active UL BWP, switching a predetermined active DL BWP of the at least one active DL BWP to the initial DL BWP.

In one embodiment, the switching the predetermined active UL BWP to the initial UL BWP comprises in case that a number of active UL BWPs is equal to a number of a supported maximum UL BWP, switching the predetermined active UL BWP of the at least one active UL BWP to the initial UL BWP; and in case that the number of active UL BWPs is smaller than the number of a supported maximum UL BWP, activating the initial UL BWP.

In one embodiment, the switching the predetermined active DL BWP to the initial DL BWP comprises in case that a number of active DL BWPs is equal to a number of a supported maximum DL BWP, switching the predetermined active DL BWP of the at least one active DL BWP to the initial DL BWP; and in case that the number of active DL BWPs is smaller than the number of a supported maximum DL BWP, activating the initial DL BWP.

In accordance with another aspect of the present disclosure, a terminal in a wireless communication system is provided. The terminal comprises a transceiver; and a controller configured to: determine whether a bandwidth part (BWP) inactivity timer associated with an active downlink (DL) BWP of a serving cell expires, determine whether a switching of the active DL BWP associated with the BWP inactivity timer is required, in case that the BWP inactivity timer associated with the active DL BWP expires, and switch the active DL BWP to a default DL BWP or initial DL BWP, in case that the switching of the at active DL BWP is required.

In accordance with an aspect of the present disclosure, a method performed by a terminal in a wireless communication system is provided. The method may be performed by a terminal in a wireless communication system. The method may comprise: identifying whether a bandwidth part (BWP) inactivity timer associated with an active downlink (DL) BWP of a serving cell expires; based on the BWP inactivity timer associated with the active DL BWP expiring, identifying whether a switching of the active DL BWP associated with the BWP inactivity timer is required; and based on the switching of the active DL BWP associated with the BWP inactivity timer being required, switching the active DL BWP to another DL BWP that is different from the active DL BWP.

In one embodiment, the method may further comprise the switching of the active DL BWP to the another DL BWP includes: switching the active DL BWP to a default DL BWP, if the default DL BWP-ID is configured, or switching the active DL BWP to an initial DL BWP, if the default DL BWP-ID is not configured.

In one embodiment, the may method further comprise based on the BWP inactivity timer associated with the active DL BWP expiring, and the switching of the active DL BWP associated with the BWP inactivity timer not being required, deactivating the active DL BWP associated with the BWP inactivity timer.

In one embodiment, the method may further comprise wherein the identifying of whether the switching of the active DL BWP associated with the BWP inactivity timer is required based on the BWP Inactivity Timer expiring is based on at least one of the following: the active DL BWP being the only active DL BWP of the Serving Cell, information indicating that switching the active DL BWP based on the expiration of the BWP inactivity timer is obtained, or another active DL BWP of the serving cell for which a BWP inactivity timer is running exists.

In one embodiment, the method may further comprise wherein the switching of the active DL BWP comprises: based on multiple active DL BWPs being associated with the BWP inactivity timer and the BWP inactivity timer expiring, deactivating the multiple active DL BWPs associated with the BWP inactivity timer, and activating the another DL BWP.

In one embodiment, the method may further comprise obtaining, from a base station, configuration information of the DL BWP inactivity timer for the active DL BWP using at least one of DL BWP configuration information for the active DL BWP, a list of DL BWP identifiers (IDs) of DL BWPs associated with the DL BWP inactivity timer, or a bitmap of DL BWPs corresponding to the DL BWPs associated with the DL BWP inactivity timer.

In one embodiment, the method may further comprise identifying that at least one of a control signal indicating downlink assignment or uplink grant has been obtained on the active DL BWP associated with the DL BWP inactivity timer, a control signal indicating the downlink assignment has been obtained for the active DL BWP associated with the DL BWP inactivity timer, or a control signal indicating the uplink grant has been obtained for an active uplink (UL) BWP; identifying whether there is no ongoing random access procedure associated with at least one of the active DL BWP, the serving cell, or the active UL BWP and the active DL BWP has the same BWP identifier as the active UL BWP, or the ongoing random access procedure associated with the active DL BWP or the serving cell is successfully completed based on reception of the PDCCH; and based on identifying that there is no ongoing random access procedure or the ongoing random access procedure is successful, starting or restarting the DL BWP inactivity timer associated with the active DL BWP or the serving cell.

In one embodiment, the method may further comprise: identifying whether a physical random access channel (PRACH) occasion is configured for at least one active uplink (UL) BWP of the serving cell; based on the PRACH occasion being not configured for the at least one active UL BWP of the serving cell, switching a predetermined active UL BWP of the at least one active UL BWP to an initial UL BWP; and based on the serving cell being a special cell (SpCell) and none of at least one active DL BWP being the initial DL BWP, switching a predetermined active DL BWP of the at least one active DL BWP to the initial DL BWP.

In one embodiment, the method may further comprise: based on the PRACH occasion being configured for an active UL BWP of any active UL BWP of the serving cell, selecting the active UL BWP configured with the PRACH occasion for random access preamble transmission; and based on the serving cell being the SpCell and none of the at least one active DL BWP having a same BWP identifier as the selected active UL BWP, switching a predetermined active DL BWP of the at least one active DL BWP to the initial DL BWP.

In one embodiment, the method may further comprise wherein the switching of the predetermined active UL BWP to the initial UL BWP comprises: at least one of: based on a number of active UL BWPs being equal to a number of a supported maximum UL BWP, switching the predetermined active UL BWP of the at least one active UL BWP to the initial UL BWP; or based on the number of active UL BWPs being smaller than the number of the supported maximum UL BWP, activating the initial UL BWP; and at least one of: based on a number of active DL BWPs being equal to a number of a supported maximum DL BWP, switching the predetermined active DL BWP of the at least one active DL BWP to the initial DL BWP; or based on the number of active DL BWPs being smaller than the number of a supported maximum DL BWP, activating the initial DL BWP.

In accordance with another aspect of the present disclosure, a terminal in a wireless communication system is provided. The terminal may be in a wireless communication system, and may comprise: a transceiver; and a processor configured to: identify whether a bandwidth part (BWP) inactivity timer associated with an active downlink (DL) BWP of a serving cell expires, based on the BWP inactivity timer associated with the active DL BWP expiring, identify whether a switching of the active DL BWP associated with the BWP inactivity timer is required, and based on the switching of the active DL BWP associated with the BWP inactivity timer being required, switch the active DL BWP to another DL BWP that is different from the active DL BWP.

In one embodiment, the terminal may further comprise: wherein the switching of the active DL BWP to the another DL BWP includes: switching the active DL BWP to a default DL BWP, if the default DL BWP-ID is configured, or switching the active DL BWP to an initial DL BWP, if the default DL BWP-ID is not configured.

In one embodiment, the terminal may further comprise: wherein the controller is further configured to: based on the BWP inactivity timer associated with the active DL BWP expiring, and the switching of the active DL BWP associated with the BWP inactivity timer not being required, deactivate the active DL BWP associated with the BWP inactivity timer.

In one embodiment, the terminal may further comprise: wherein the identifying of whether the switching of the active DL BWP associated with the BWP inactivity timer is required based on the BWP Inactivity Timer expiring is based on at least one of the following: the active DL BWP being the only active DL BWP of the Serving Cell, information indicating that switching the active DL BWP based on the expiration of the BWP inactivity timer is obtained, or an other active DL BWP of the serving cell for which a BWP inactivity timer is running exists.

In one embodiment, the terminal may further comprise: wherein the controller is further configured to: based on multiple active DL BWPs being associated with the BWP inactivity timer and the BWP inactivity timer expiring, deactivate the multiple active DL BWPs associated with the BWP inactivity timer, and activating the another DL BWP.

In one embodiment, the terminal may further comprise: wherein the controller is further configured to: obtain, from a base station, configuration information of the DL BWP inactivity timer for the active DL BWP using at least one of DL BWP configuration information for the active DL BWP, a list of DL BWP identifiers (IDs) of DL BWPs associated with the DL BWP inactivity timer, or a bitmap of DL BWPs corresponding to the DL BWPs associated with the DL BWP inactivity timer.

In one embodiment, the terminal may further comprise: wherein the controller is further configured to: identify that at least one of a control signal indicating downlink assignment or uplink grant has been obtained on the active DL BWP associated with the DL BWP inactivity timer, a control signal indicating the downlink assignment has been obtained for the active DL BWP associated with the DL BWP inactivity timer, or a control signal indicating the uplink grant has been obtained for an active uplink (UL) BWP, identify whether there is no ongoing (RAP) associated with at least one of the active DL BWP, the serving cell, or the active UL BWP and the active DL BWP has the same BWP identifier as the active UL BWP, or the ongoing RAP associated with the active DL BWP or the serving cell is successfully completed based on reception of the PDCCH, and based on identifying that there is no ongoing RAP or the ongoing RAP is successful, start or restart the DL BWP inactivity timer associated with the active DL BWP or the serving cell.

In one embodiment, the terminal may further comprise: wherein the controller is further configured to: identify whether a physical random access channel (PRACH) occasion is configured for at least one active uplink (UL) BWP of the serving cell, based on the PRACH occasion not being configured for the at least one active UL BWP of the serving cell, switch a predetermined active UL BWP of the at least one active UL BWP to an initial UL BWP, and based on the serving cell being a special cell (SpCell) and none of at least one active DL BWP being the initial DL BWP, switch a predetermined active DL BWP of the at least one active DL BWP to the initial DL BWP.

In one embodiment, the terminal may further comprise: wherein the controller is further configured to: based on the PRACH occasion being configured for an active UL BWP of the any active UL BWP, select the active UL BWP configured with the PRACH occasion for random access preamble transmission, and based on the serving cell being the SpCell and none of the at least one active DL BWP having a same BWP identifier as the selected active UL BWP, switch a predetermined active DL BWP of the at least one active DL BWP to the initial DL BWP.

In one embodiment, the terminal may further comprise: wherein the controller is further configured to: at least one of: based on a number of active UL BWPs being equal to a number of a supported maximum UL BWP, switching the predetermined active UL BWP of the at least one active UL BWP to the initial UL BWP, or based on the number of active UL BWPs being smaller than the number of a supported maximum UL BWP, activating the initial UL BWP, and at least one of: based on a number of active DL BWPs being equal to a number of a supported maximum DL BWP, switching the predetermined active DL BWP of the at least one active DL BWP to the initial DL BWP, and based on the number of active DL BWPs being smaller than the number of a supported maximum DL BWP, activating the initial DL BWP.

In accordance with an aspect of the present disclosure, a method performed by a terminal in a wireless communication system is provided. The method may be performed by a terminal in a wireless communication system. The method may comprise: based on a timer associated with an active downlink (DL) bandwidth part (BWP) of a serving cell expiring: identifying whether a switching of the active DL BWP associated with the timer is required; and based on the switching of the active DL BWP associated with the timer being required, switching the active DL BWP to another DL BWP that is different from the active DL BWP.

In one embodiment, the method may further comprise: wherein the switching of the active DL BWP to the another DL BWP includes: switching the active DL BWP to a default DL BWP, if the default DL BWP-ID is configured, or switching the active DL BWP to an initial DL BWP, if the default DL BWP-ID is not configured.

In one embodiment, the method may further comprise: based on the BWP inactivity timer associated with the active DL BWP expiring, and the switching of the active DL BWP associated with the BWP inactivity timer not being required, deactivating the active DL BWP associated with the BWP inactivity timer.

Advantageous Effects

In a feature of the present disclosure, it is possible to provide a method and apparatus for handling of multiple active bandwidth parts.

Other aspects, advantages, and salient features of the disclosure will become apparent to those skilled in the art from the following detailed description, taken in conjunction with the annexed drawings, discloses various embodiments of the present disclosure.

DETAILED DESCRIPTION

Figure 1:
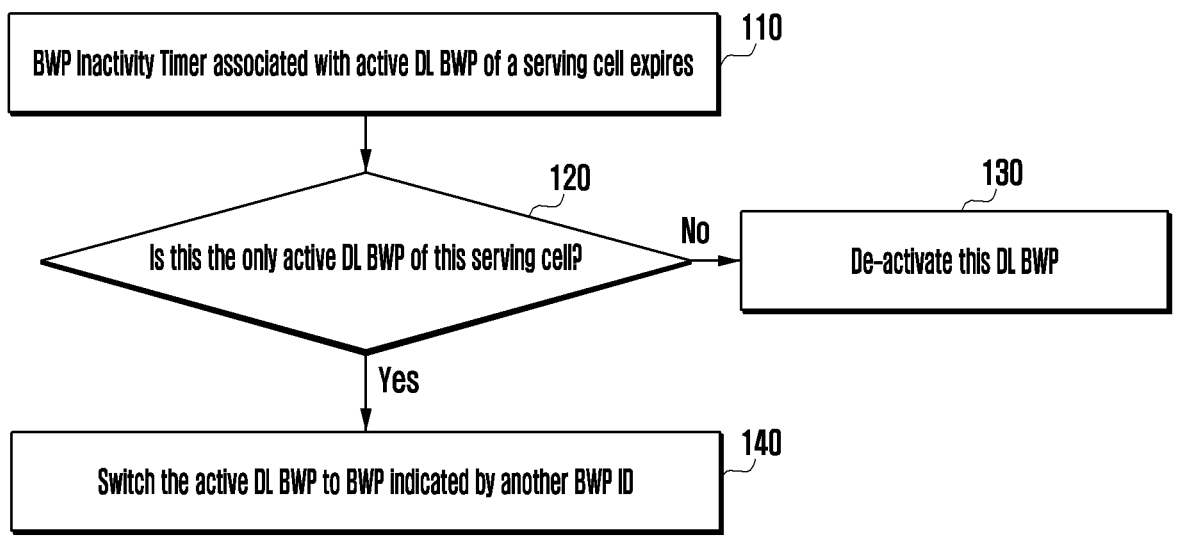
FIG. 1 illustrates an example of a method of handling a BWP inactivity timer expiry wherein the BWP inactivity timer is independently maintained for each active DL BWP according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the drawings, some elements are exaggerated, omitted, or only outlined in brief, and thus may be not drawn to scale. The same or similar reference symbols are used throughout the drawings to refer to the same or like parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, a special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an field-programmable gate array (FPGA) or application specific integrated circuits (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card. A component or unit may include one or more processors.

Prior to the detailed description, terms or definitions necessary to understand the present disclosure are described. However, these terms should be construed in a non-limiting way.

The "base station"(BS) may be an entity communicating with a user equipment and may be referred to as a BS, a base transceiver station (BTS), a NodeB (NB), an eNodeB (eNB), an access point (AP), a fifth generation (5G) NB (5GNB), or a next generation NB (gNB).

The "user equipment" (UE) is an entity communicating with a base station and may be referred to as a mobile device, a UE, device, a mobile station (MS), a mobile equipment (ME), or a terminal.

The 5G wireless communication system (also referred to as next generation radio or NR), supports a standalone mode of operation as well as dual connectivity (DC). In DC, a multiple Rx/Tx UE may be configured to utilize resources provided by two different nodes (or NBs) connected via a non-ideal backhaul. One node may act as the master node (MN) and the other node may act as the secondary node (SN). The MN and SN may be connected via a network (via respective network interface cards/interfaces) and at least the MN may be connected to the core network. NR also supports multi-RAT (radio access technology) dual connectivity (MR-DC) operation, whereby a UE in RRC_CONNECTED is configured to utilize radio resources provided by two distinct schedulers, located in two different nodes connected via a non-ideal backhaul and providing either E-UTRA (i.e. if the node is an ng-eNB) or NR access (i.e. if the node is a gNB).

In NR for a UE in RRC_CONNECTED not configured with carrier aggregation (CA)/DC, there is only one serving cell comprising of the primary cell. For a UE in RRC_CONNECTED configured with CA/DC, the term 'serving cells' is used to denote the set of cells comprising of the Special Cell(s) and all secondary cells.

In NR, the term master cell group (MCG) refers to a group of serving cells associated with the master node, comprising of the PCell and optionally one or more SCells. In NR the term secondary cell group (SCG) refers to a group of serving cells associated with the secondary node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the reconfiguration with sync procedure. For dual connectivity operation the term SpCell (i.e. Special Cell) refers to the PCell of the MCG or the PSCell of the SCG, otherwise the term Special Cell refers to the PCell.

In NR bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a bandwidth part (BWP) and BA is achieved by configuring the UE with BWP(s) and telling the UE which of the configured BWPs is currently active. When BA is configured, the UE only has to monitor physical downlink control channel (PDCCH) on the one active BWP i.e. it does not have to monitor PDCCH on the entire DL frequency of the serving cell. A serving cell is configured with one or more BWPs, and for a serving cell, there is one active BWP at any point in time. The BWP switching for a serving cell is used to activate an inactive BWP and deactivate an active BWP at a time. The BWP switching is controlled by the PDCCH indicating a downlink assignment or an uplink grant, or by RRC (radio resource control) signaling. Additionally, a BWP inactivity timer is used to switch the active DL (downlink) BWP to the default DL BWP or initial DL BWP of a serving cell. One of the configured BWPs of a serving cell can be a default DL BWP and is indicated in BWP configuration received from gNB. Initial DL BWP is also signaled (either in system information or in dedicated signaling). One of the configured BWPs of a serving cell can be a first active DL BWP and is indicated in BWP configuration received from gNB. It is to be noted that BWP inactivity timer may or may not be configured in BWP configuration of each serving cell received from gNB. BWP inactivity timer, if configured, is signaled independently for each serving cell. None or multiple serving cells may be configured with BWP inactivity timer.

In NR upon expiry of BWP inactivity timer, active DL BWP is switched to default DL BWP. Upon initiation of the random access procedure (RAP) on a serving cell, if PRACH occasions are not configured for the active UL (uplink) BWP of this serving cell: the UE switches the active UL BWP to BWP indicated by initialUplinkBWP; If this serving cell is a SpCell, the UE also switches the active DL BWP to BWP indicated by initialDownlinkBWP. Upon initiation of the random access procedure on a serving cell, if PRACH occasions are configured for the active UL BWP of this serving cell: if this serving cell is a SpCell and if the active DL BWP of this serving cell does not have the same bwp-Id as the active UL BWP of this serving cell, the UE switches the active DL BWP to the DL BWP with the same bwp-Id as the active UL BWP.

In NR, for a serving cell, if a PDCCH addressed to cell radio network temporary identifier (C-RNTI) or configured scheduling RNTI (CS-RNTI) indicating downlink assignment or uplink grant is received on the active BWP; or if a PDCCH addressed to C-RNTI or CS-RNTI indicating downlink assignment or uplink grant is received for the active BWP; or if a medium access control (MAC) protocol data unit (PDU) is transmitted in a configured uplink grant or received in a configured downlink assignment:
  if there is no ongoing random access procedure associated with this serving cell; or
  if the ongoing random access procedure associated with this serving cell is successfully completed upon reception of this PDCCH addressed to C-RNTI:
    the UE start or restart the BWP Inactivity Timer (bwp-InactivityTimer) associated with the active DL BWP.

In NR BWP operation is being enhanced to support multiple active BWPs. The multiple active BWPs can be useful for supporting multiple services (e.g. EMBB, URLCC) simultaneously wherein data packets of each service are exchanged over different BWPs. The multiple active BWPs can also be useful in NR cells operating in unlicensed bands wherein data packets can be exchanged via a BWP for which LBT (listen before talk) is successful. If multiple active BWPs is supported then several issues arise, such as whether there will be one or multiple BWP inactivity timer in serving cell; upon expiry of BWP inactivity timer what happens to active BWPs; how to handle UL/DL BWP switching upon initiation of random access procedure; how to handle the BWP inactivity timer upon reception of PDCCH addressed to C-RNTI or CS-RNTI.

BWP Inactivity Timer Operation

BWP Inactivity Timer Configuration Handling Method 1

In one method of the disclosure, in a serving cell, each active DL BWP can be optionally configured with a BWP inactivity timer. This means that the base station (e.g., gNB) may configure zero or one or more DL BWPs with a BWP inactivity timer. The BWP inactivity timer may be maintained independently for each DL BWP. For example, based on there being four configured DL BWPs (B1, B2, B3 and B4), the base station (e.g., gNB) may configure the BWP inactivity timer for B1 and B3. The UE may maintain the BWP inactivity timer for B1 and B3 separately based on both B1 and B3 being active.

In one embodiment, the value of the BWP inactivity timer can be optionally configured independently for each configured DL BWP. If the base station (e.g., gNB) wants to associate a configured DL BWP with a BWP inactivity timer, a BWP inactivity timer for that DL BWP can be signaled in the BWP configuration of that DL BWP.

In another embodiment, the value of the BWP inactivity timer may be common for all the DL BWPs which are associated with the BWP inactivity timer. The BWP inactivity timer may be independently maintained for each DL BWP associated with the BWP inactivity timer.

If the base station (e.g., gNB) wants to associate a DL BWP with a BWP inactivity timer, an indication (e.g., a one bit indication) can be included in the BWP configuration (configuration information) of that DL BWP.

Alternatively, the base station (e.g., gNB) can include a list of BWP-IDs (identifiers) of the DL BWPs, which are associated with the BWP inactivity timer. In an embodiment, this list of BWP-IDs may be included only when multiple active DL BWPs are supported. And, based on the list of BWP-IDs not being included, the configured BWP inactivity timer may be associated with an active DL BWP.

Alternatively, the base station (e.g., gNB) can include a bitmap of DL BWPs, wherein each bit in the bitmap corresponds to a different BWP ID. Based on a bit corresponding to a BWP ID being set in the bitmap, then that DL BWP may be associated with a BWP inactivity timer. In an embodiment, this bitmap may be included only when multiple active DL BWPs are supported. And, based on the bitmap not being included, the configured BWP inactivity timer may be associated with an active DL BWP.

BWP Inactivity Timer Configuration Handling Method 2

In another method of the disclosure, in a serving cell, each active DL BWP can be optionally associated with a BWP inactivity timer. There may be a single BWP inactivity timer (if configured) in a serving cell. This single BWP inactivity timer can be associated with one or more DL BWPs. DL BWPs which are associated with this single BWP inactivity timer may be signaled by the base station (e.g., gNB) in BWP configuration.

The base station (e.g., gNB) may include a list of BWP-IDs of DL BWPs which may be associated with a BWP inactivity timer. In an embodiment, this list may be included only when multiple active DL BWPs are supported. And, based on the list of BWP-IDs not being included, the configured BWP inactivity timer may be associated with an active DL BWP.

Alternatively, the base station (e.g., gNB) may include a bitmap of DL BWPs wherein each bit in bitmap corresponds to a different BWP ID. If a bit corresponding to a BWP ID is set in the bitmap, then that DL BWP is associated with BWP inactivity timer. In an embodiment, this bitmap may be included only when multiple active DL BWPs are supported. And, if this list is not included, the configured BWP inactivity timer is associated with active DL BWP.

Independently Maintained BWP Inactivity Timer Configuration Handling Method 1

Below is described handling of a BWP inactivity timer expiry wherein the BWP inactivity timer is independently maintained for each active DL BWP associated with the BWP inactivity timer.

There can be one or more active DL BWPs. The BWP inactivity timer may be independently maintained for each active DL BWP associated with the BWP inactivity timer.

FIG. 1 illustrates an example of a method of handling a BWP inactivity timer expiry wherein the BWP inactivity timer is independently maintained for each active DL BWP according to an embodiment of the present disclosure.

Referring to FIG. 1, a method that includes the operation of handling a BWP inactivity timer expiry is illustrated. At operation 110, in a serving cell, a BWP Inactivity Timer associated with an active DL BWP expires. At operation 120, based on the BWP Inactivity Timer expiring, the UE may identify whether an active DL BWP is the only active DL BWP in the serving cell or not.

If the active DL BWP is the only active DL BWP of the serving cell, then, at operation 140, the UE may switch the active DL BWP to another BWP indicated by (or associated with) an identifier (e.g., the defaultDownlinkBWP-Id (default DL BWP-ID) or a BWP indicated by an initialDownlinkBWP(initial DL BWP_, based on, for example, the defaultDownlinkBWP-Id not being configured).

If the active DL BWP of the serving cell is not the only active DL BWP of the serving cell, then, at operation 130, the UE may deactivate the active DL BWP.

In one embodiment of the disclosure, the MAC entity shall (or may) perform the following for one or more activated Serving Cell (e.g., each activated Serving Cell):
1>if the bwp-InactivityTimer associated with an active DL BWP expires:
  2>if this active DL BWP is the only active DL BWP:
    3>if the defaultDownlinkBWP-Id is configured:
      4>switch this active DL BWP to a BWP indicated by the defaultDownlinkBWP-Id.
    3>else:
      4>switch this active DL BWP to a BWP indicated by the initialDownlinkBWP.
  2>else:
    3>deactivate this active DL BWP.

In another embodiment of the disclosure, the MAC entity shall (or may) perform the following for one or more activated Serving Cell (e.g., each activated Serving Cell):
1>if the bwp-InactivityTimer associated with an active DL BWP expires:
  2>if this active DL BWP is the only active DL BWP:
    3>switch this active DL BWP to a BWP indicated by the defaultDownlinkBWP-Id.
  2>else:
    3>deactivate this active DL BWP.

In this embodiment, it may be assumed that defaultDownlinkBWP-Id is always configured in a serving cell if bwp-InactivityTimer is configured for at least one DL BWP in that serving cell.

Independently Maintained BWP Inactivity Timer Configuration Handling Method 2

Figure 2:
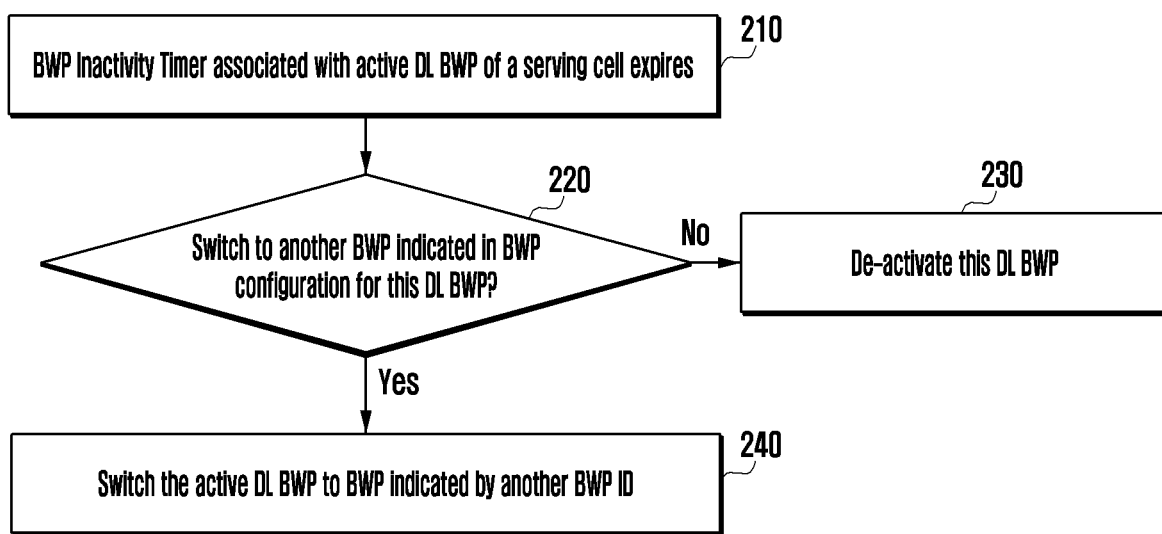
FIG. 2 illustrates another example of a method of handling a BWP inactivity timer expiry wherein the BWP inactivity timer is independently maintained for each active DL BWP according to an embodiment of the present disclosure.

FIG. 2 illustrates another example of a method of handling a BWP inactivity timer expiry wherein the BWP inactivity timer is independently maintained for each active DL BWP according to an embodiment of the present disclosure.

Referring to FIG. 2, another method of the disclosure including the operation of handling BWP inactivity timer expiry is illustrated. At operation 210, in a serving cell, a bwp-InactivityTimer associated with an active DL BWP expires. At operation 220, based on the BWP Inactivity Timer associated with the active DL BWP expiring, the UE may identify whether the base station (e.g., gNB) has indicated switching of this DL BWP to a default BWP upon expiry of a bwp-InactivityTimer or not. The indication of switching may be signaled by the base station (e.g., gNB) in BWP configuration information of that BWP. In an embodiment, this indication of switching can be common for all DL BWPs.

If switching of this DL BWP to a default BWP upon expiry of bwp-InactivityTimer is indicated by the base station (e.g., gNB), then, at operation 240, the UE may switch this active DL BWP to a BWP indicated by the defaultDownlinkBWP-Id or to a BWP indicated by the initialDownlinkBWP if defaultDownlinkBWP-Id is not configured.

If switching of this DL BWP to default BWP upon expiry of bwp-InactivityTimer is not indicated by the base station (e.g., gNB), then, at operation 230, the UE may deactivate this active DL BWP.

In one embodiment of the disclosure, the MAC entity shall (or may) perform the following for one or more activated Serving Cell (e.g., each activated Serving Cell):
1>if the bwp-InactivityTimer associated with an active DL BWP expires:
  2>if switching of this DL BWP to default BWP upon expiry of bwp-InactivityTimer is indicated by gNB:
    3>if the defaultDownlinkBWP-Id is configured:
      4>switch this active DL BWP to a BWP indicated by the defaultDownlinkBWP-Id.
    3>else:
      4>switch this active DL BWP to a BWP indicated by the initialDownlinkBWP.
  2>else:
    3>deactivate this active DL BWP.

In another embodiment, the MAC entity shall (or may) perform the following for one or more activated Serving Cell (e.g., each activated Serving Cell):
1>if the bwp-InactivityTimer associated with an active DL BWP expires:
  2>if switching of this DL BWP to default BWP upon expiry of bwp-InactivityTimer is indicated by gNB:
    3>switch this active DL BWP to a BWP indicated by the defaultDownlinkBWP-Id.
  2>else:
    3>deactivate this active DL BWP.

In this embodiment, it may be assumed that the default DL BWP-ID is always configured in a serving cell, if the BWP Inactivity Timer is configured for at least one DL BWP in that serving cell.

Independently Maintained BWP Inactivity Timer Configuration Handling Method 3

Figure 3:
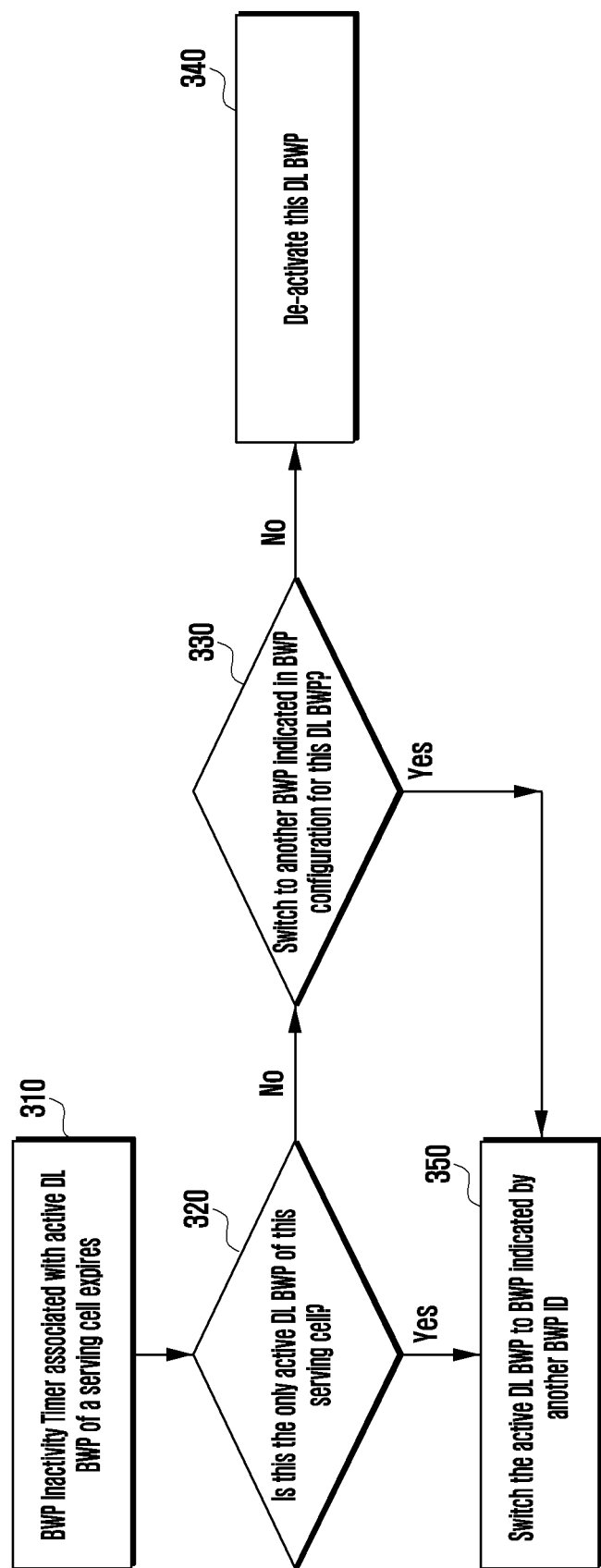
FIG. 3 illustrates another example of a method of handling a BWP inactivity timer expiry wherein the BWP inactivity timer is independently maintained for each active DL BWP according to an embodiment of the present disclosure.

FIG. 3 illustrates another example of a method of handling a BWP inactivity timer expiry wherein the BWP inactivity timer is independently maintained for each active DL BWP according to an embodiment of the present disclosure.

Referring to FIG. 3, another method of the disclosure including the operation of handling BWP inactivity timer expiry is illustrated. At operation 310, in a serving cell, the BWP Inactivity Timer(bwp-InactivityTimer) associated with an active DL BWP expires. Then, at operation 320, the UE may identify whether this active DL BWP is the only active DL BWP or not.

Based on the BWP Inactivity Timer(bwp-InactivityTimer) associated with the active DL BWP expiring, and this active DL BWP being the only active DL BWP, then, at operation 350, the UE may switch this active DL BWP to another BWP ID, such as, a BWP indicated by (or associated with) the default DL BWP-ID(defaultDownlinkBWP-Id), if the default DL BWP-ID(defaultDownlinkBWP-Id) is configured, or switch the active DL BWP to a BWP indicated by (or associated with) an initial DL BWP(initialDownlinkBWP), if the default DL BWP-ID((defaultDownlinkBWP-Id) is not configured.

Based on the BWP Inactivity Timer(bwp-InactivityTimer) associated with the active DL BWP expiring, and this active DL BWP being the only active DL BWP, then, at operation 330, the UE may identify whether the base station (e.g., gNB) has indicated switching of this DL BWP to another BWP (e.g., the default BWP) upon expiry of the BWP Inactivity Timer(bwp-Inactivity-Timer). The indication may be signaled by the base station (e.g., gNB) in a BWP configuration of that BWP. In an embodiment, this indication may be common for all DL BWPs.

Based on the BWP Inactivity Timer(bwp-InactivityTimer) associated with the active DL BWP expiring, and the switching of this DL BWP to a default BWP upon expiry of the BWP Inactivity Timer(bwp-InactivityTimer) being indicated by the base station (e.g., gNB), then, at operation 350, the UE may switch this active DL BWP to another BWP, such as, a BWP indicated by (or associated with) the default DL BWP-ID(defaultDownlinkBWP-Id), if the default DL BWP-ID(defaultDownlinkBWP-Id) is configured, or a BWP associated with an initial DL BWP(initialDownlinkBWP), if the default DL BWP-ID(defaultDownlinkBWP-Id) is not configured.

Based on the BWP Inactivity Timer(bwp-InactivityTimer) associated with the active DL BWP expiring, and the switching of this DL BWP to a default BWP upon expiry of the BWP Inactivity Timer not being indicated by the base station (e.g., gNB), then, at operation 340, the UE may deactivate this active DL BWP.

In one embodiment of the disclosure, the MAC entity shall (or may) perform the following for one or more activated Serving Cell (e.g., each activated Serving Cell):
1>if the bwp-InactivityTimer associated with an active DL BWP expires:
  2>if this active DL BWP is the only active DL BWP; or
  2>if switching of this DL BWP to default BWP upon expiry of bwp-InactivityTimer is indicated by gNB:
    3>if the defaultDownlinkBWP-Id is configured:
      4>switch this active DL BWP to a BWP indicated by the defaultDownlinkBWP-Id.
    3>else:
      4>switch this active DL BWP to a BWP indicated by the initialDownlinkBWP.
  2>else:
    3>deactivate this active DL BWP. In one embodiment of the disclosure, the MAC entity shall (or may) perform the following for one or more activated Serving Cell (e.g., each activated Serving Cell):
1>if the bwp-InactivityTimer associated with an active DL BWP expires:
  2>if this active DL BWP is the only active DL BWP; or
  2>if switching of this DL BWP to default BWP upon expiry of bwp-InactivityTimer is indicated by gNB:
    3>switch this active DL BWP to a BWP indicated by the defaultDownlinkBWP-Id.
  2>else:
    3>deactivate this active DL BWP.

In this embodiment, it may be assumed that the default DL BWP-ID(defaultDownlinkBWP-Id) is always configured in a serving cell if the BWP Inactivity Timer(bwp-InactivityTimer) is configured for at least one DL BWP in that serving cell.

Independently Maintained BWP Inactivity Timer Configuration Handling Method 4

Figure 4:
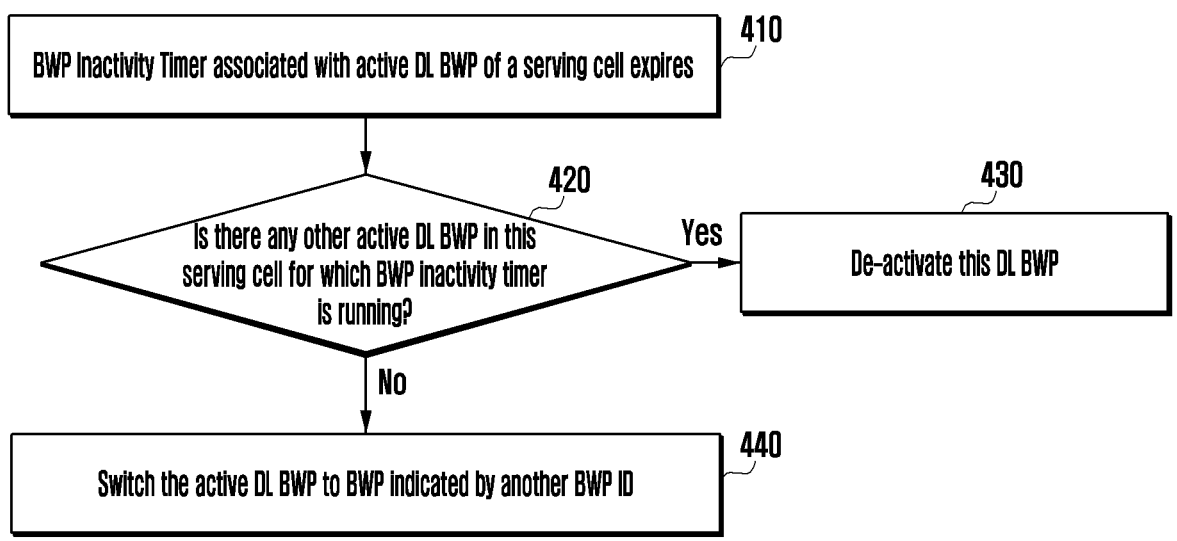
FIG. 4 illustrates another example of a method of handling a BWP inactivity timer expiry wherein the BWP inactivity timer is independently maintained for each active DL BWP according to an embodiment of the present disclosure.

FIG. 4 illustrates another example of a method of handling a BWP inactivity timer expiry wherein the BWP inactivity timer is independently maintained for each active DL BWP according to an embodiment of the present disclosure.

Referring to FIG. 4, another method of the disclosure including the operation of handling BWP inactivity timer expiry is illustrated. At operation 410, in a serving cell, the BWP Inactivity Timer(bwp-InactivityTimer) associated with an active DL BWP expires. At operation 420, the UE may, based on the BWP Inactivity Timer associated with the active DL BWP expiring, identify whether there is any other active DL BWP of this serving cell for which a BWP inactivity timer is running.

Based on the BWP Inactivity Timer(bwp-InactivityTimer) associated with the active DL BWP expiring, and identifying that there is not any other active DL BWP of this serving cell for which a BWP inactivity timer is running, at operation 440, the UE may switch this active DL BWP to another BWP, such as, a BWP indicated by (or associated with) the default DL BWP-ID(defaultDownlinkBWP-Id), if the default DL BWP-ID(defaultDownlinkBWP-Id) is configured, or a BWP indicated by (or associated with) an initial DL BWP (initialDownlinkBWP), if the default DL BWP-ID(defaultDownlinkBWP-Id) is not configured.

Based on the BWP Inactivity Timer(bwp-InactivityTimer) associated with the active DL BWP expiring, and identifying that there is another active DL BWP of this serving cell for which a BWP inactivity timer is running, at operation 430, the UE may deactivate this active DL BWP.

In one embodiment of the disclosure, the MAC entity shall (or may) perform the following for one or more activated Serving Cell (e.g., each activated Serving Cell):
1>if the bwp-InactivityTimer associated with an active DL BWP expires:
  2>if bwp-InactivityTimer is not running for any other DL BWP of this serving cell:
    3>if the defaultDownlinkBWP-Id is configured:
      4>switch this active DL BWP to a BWP indicated by the defaultDownlinkBWP-Id.
    3>else:
      4>switch this active DL BWP to a BWP indicated by the initialDownlinkBWP.
  2>else:
    3>deactivate this active DL BWP.

In another embodiment of the proposed invention, the MAC entity shall perform the following for one or more activated Serving Cell (e.g., each activated Serving Cell):
1>if the bwp-InactivityTimer associated with an active DL BWP expires:
  2>if bwp-InactivityTimer is not running for any other DL BWP of this serving cell:
    3>switch this active DL BWP to a BWP indicated by the defaultDownlinkBWP-Id.
  2>else:
    3>deactivate this active DL BWP.

In this embodiment, it may be assumed that the default DL BWP-ID is always configured in a serving cell, if the BWP Inactivity Timer is configured for at least one DL BWP in that serving cell.

Independently Maintained BWP Inactivity Timer Configuration Handling Method 5

Figure 5:
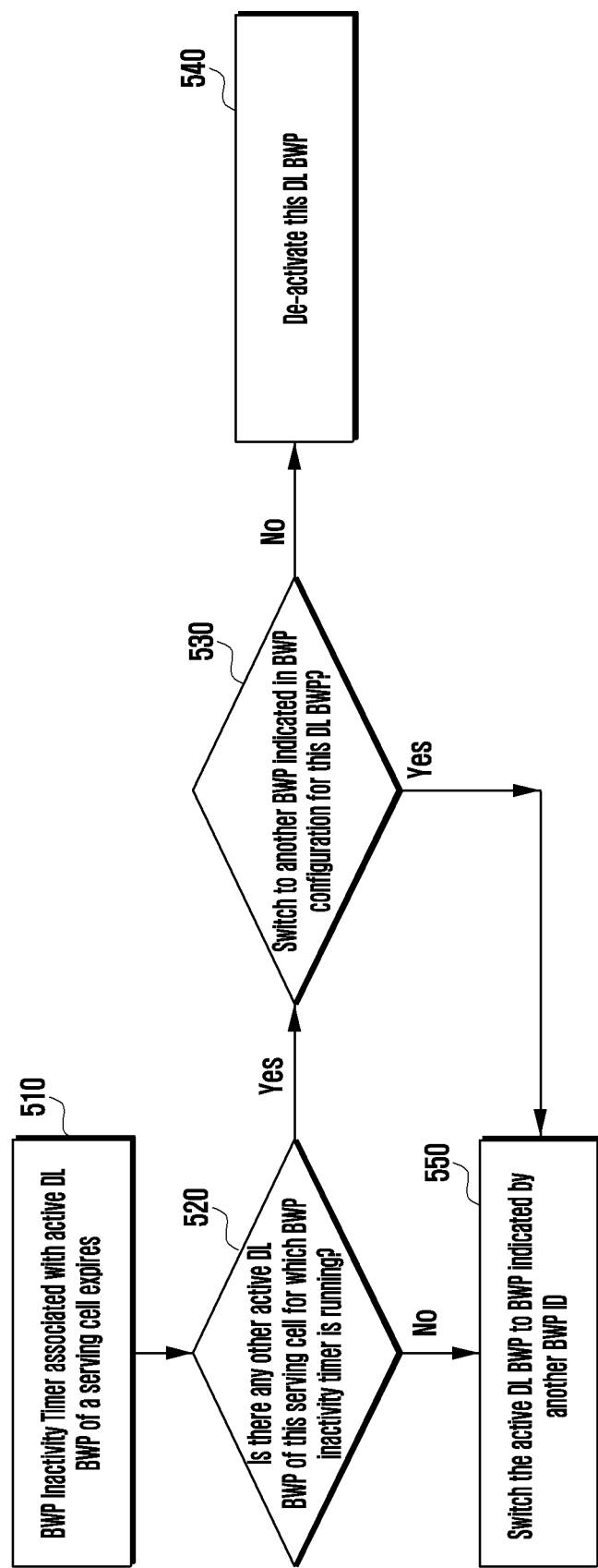
FIG. 5 illustrates another example of a method of handling a BWP inactivity timer expiry wherein the BWP inactivity timer is independently maintained for each active DL BWP according to an embodiment of the present disclosure.

FIG. 5 illustrates another example of a method of handling a BWP inactivity timer expiry wherein the BWP inactivity timer is independently maintained for each active DL BWP according to an embodiment of the present disclosure.

Referring to FIG. 5, another method of the disclosure including the operation of handling BWP inactivity timer expiry is illustrated. At operation 510, in a serving cell, a BWP Inactivity Timer(bwp-InactivityTimer) associated with an active DL BWP expires. At operation 520, the UE may identify whether there is any other active DL BWP of this serving cell for which a BWP inactivity timer is running.

Based on the BWP Inactivity Timer(bwp-InactivityTimer) associated with the active DL BWP expiring, and the BWP Inactivity Timer(bwp-InactivityTimer) not running for any other DL BWP of this serving cell, at operation 550, the UE may switch this active DL BWP to another BWP, such as, a BWP indicated by (or associated with) a default DL BWP-ID(defaultDownlinkBWP-Id), if the default DL BWP-ID(defaultDownlinkBWP-Id) is configured, or a BWP associated with an initial DL BWP(initialDownlinkBWP), if the default DL BWP-ID(defaultDownlinkBWP-Id) is not configured.

Based on the BWP Inactivity Timer(bwp-InactivityTimer) associated with the active DL BWP expiring, and the BWP Inactivity Timer(bwp-InactivityTimer) running for any other DL BWP of this serving cell, at operation 530, the UE may identify whether the base station (e.g., gNB) has indicated switching of this DL BWP to a default BWP, upon expiry of the BWP Inactivity Timer(bwp-InactivityTimer). The indication can be signaled by the base station (e.g., gNB) in a BWP configuration. In an embodiment, this indication can be common for a plurality of DL BWPs (e.g., all DL BWPs, all DL BWPS of the serving cell).

Based on the BWP Inactivity Timer(bwp-InactivityTimer) associated with the active DL BWP expiring, the BWP Inactivity Timer(bwp-InactivityTimer) running for any other DL BWP of this serving cell, and identifying that the base station (e.g., gNB) has indicated switching of this DL BWP to a default BWP, at operation 550, the UE may switch this active DL BWP to another BWP, such as, a BWP indicated by (or associated with) the default DL BWP-ID(defaultDownlinkBWP-Id), if the default DL BWP-ID(defaultDownlinkBWP-Id) is configured, or a BWP associated with an initial DL BWP (initialDownlinkBWP), if the default DL BWP-ID(defaultDownlinkBWP-Id) is not configured.

Based on the BWP Inactivity Timer(bwp-InactivityTimer) associated with the active DL BWP expiring, and switching of this DL BWP to a default BWP upon expiry of the BWP Inactivity Timer(bwp-InactivityTimer) not being indicated by the gNB, at operation 540, the UE may deactivate this active DL BWP.

In one embodiment of the disclosure, the MAC entity shall perform the following for one or more activated Serving Cell (e.g., each activated Serving Cell):
1>if the bwp-InactivityTimer associated with an active DL BWP expires:
  2>if bwp-InactivityTimer is not running for any other DL BWP of this serving cell; or
  2>if switching of this DL BWP to default BWP upon expiry of bwp-InactivityTimer is indicated by gNB:
    3>if the defaultDownlinkBWP-Id is configured:
      4>switch this active DL BWP to a BWP indicated by the defaultDownlinkBWP-Id.
    3>else:
      4>switch this active DL BWP to a BWP indicated by the initialDownlinkBWP.
  2>else:
    3>deactivate this active DL BWP.

In one embodiment of the proposed invention, the MAC entity shall perform the following for one or more activated Serving Cell (e.g., each activated Serving Cell):
  1>if the bwp-InactivityTimer associated with an active DL BWP expires:
    2>if bwp-InactivityTimer is not running for any other DL BWP of this serving cell; or
    2>if switching of this DL BWP to default BWP upon expiry of bwp-InactivityTimer is indicated by gNB:
      3>switch this active DL BWP to a BWP indicated by the defaultDownlinkBWP-Id.
    2>else:
      3>deactivate this active DL BWP.

In this embodiment it is assumed that defaultDownlinkBWP-Id is always configured in a serving cell if BWP Inactivity Timer is configured for at least one DL BWP in that serving cell.

Handling BWP Inactivity Timer Expiry Wherein Single BWP Inactivity Timer is Maintained for all Active DL BWPs Associated With BWP Inactivity Timer There can be one or more active DL BWPs. A single BWP inactivity timer is maintained for all active DL BWPs associated with BWP inactivity timer.

In one method of invention, the operation in a serving cell, if BWP Inactivity Timer(bwp-InactivityTimer) expires, the UE determines if there is only one active DL BWP associated with BWP Inactivity Timer(bwp-InactivityTimer) in that serving cell or not.
  if there is only one active DL BWP associated with BWP Inactivity Timer(bwp-InactivityTimer) in that serving cell, then the UE switches this active DL BWP to a BWP indicated by the defaultDownlinkBWP-Id or to a BWP indicated by the initialDownlinkBWP if defaultDownlinkBWP-Id is not configured.
  if there are multiple active DL BWPs associated with BWP Inactivity Timer(bwp-InactivityTimer) in that serving cell: the UE deactivates all the active DL BWPs. The UE activates a BWP indicated by the defaultDownlinkBWP-Id or a BWP indicated by the initialDownlinkBWP if defaultDownlinkBWP-Id is not configured.

In one method of invention the operation in a serving cell, if BWP Inactivity Timer(bwp-InactivityTimer) expires:
  The UE deactivates all the active DL BWPs associated with BWP Inactivity Timer(bwp-InactivityTimer). The UE activates a BWP indicated by the defaultDownlinkBWP-Id, if not already activated. Or the UE activates a BWP indicated by the initialDownlinkBWP, if defaultDownlinkBWP-Id is not configured and the BWP indicated by the initialDownlinkBWP is not already activated.

Handling BWP Inactivity Timer (Re)Start Wherein the BWP Inactivity Timer is Independently Maintained for Each Active DL BWP Associated With BWP Inactivity Timer There can be one or more active DL BWPs. Zero or one or more DL BWPs can be associated with BWP inactivity timer. The BWP inactivity timer is independently maintained for each active DL BWP associated with BWP inactivity timer.

Handling BWP Inactivity Timer (Re-)Start Method 1: MAC entity in the UE performs the following operation for one or more activated Serving Cell (e.g., each activated Serving Cell):
  if a PDCCH addressed to C-RNTI or CS-RNTI indicating downlink assignment or uplink grant is received on an active DL BWP associated with a BWP inactivity timer:
    if there is no ongoing random access procedure associated with this active DL BWP of this serving cell; or
    if the ongoing random access procedure associated with this active DL BWP of this serving cell is successfully completed upon reception of this PDCCH addressed to C-RNTI:
      start or restart the BWP Inactivity Timer(bwp-InactivityTimer) associated with this active DL BWP.
  if a PDCCH addressed to C-RNTI or CS-RNTI indicating downlink assignment is received for an active DL BWP associated with BWP inactivity timer:
    if there is no ongoing random access procedure associated with this active DL BWP of this serving cell; or
    if the ongoing random access procedure associated with this active DL BWP of this serving cell is successfully completed upon reception of this PDCCH addressed to C-RNTI:
      start or restart the BWP Inactivity Timer(bwp-InactivityTimer) associated with this active DL BWP.
  if a PDCCH addressed to C-RNTI or CS-RNTI indicating uplink grant is received for an active UL BWP:
    if there is no ongoing random access procedure associated with this active UL BWP and active DL BWP having same BWP ID as this active UL BWP of this serving cell:
      start or restart the BWP Inactivity Timer(bwp-InactivityTimer) associated with the active DL BWP having the same BWP ID as this active UL BWP.

Handling BWP Inactivity Timer (Re-)Start Method 2: MAC entity in the UE performs the following operation for one or more activated Serving Cell (e.g., each activated Serving Cell):
  if a PDCCH addressed to C-RNTI or CS-RNTI indicating downlink assignment or uplink grant is received on an active DL BWP associated with BWP inactivity timer:
    if there is no ongoing random access procedure associated with this serving cell; or
    if the ongoing random access procedure associated with this serving cell is successfully completed upon reception of this PDCCH addressed to C-RNTI:
      start or restart the BWP Inactivity Timer(bwp-InactivityTimer) associated with this active DL BWP.
  if a PDCCH addressed to C-RNTI or CS-RNTI indicating downlink assignment is received for an active DL BWP associated with BWP inactivity timer:
    if there is no ongoing random access procedure associated with this serving cell; or
    if the ongoing random access procedure associated with this serving cell is successfully completed upon reception of this PDCCH addressed to C-RNTI:
      start or restart the BWP Inactivity Timer(bwp-InactivityTimer) associated with this active DL BWP.
  if a PDCCH addressed to C-RNTI or CS-RNTI indicating uplink grant is received for an active UL BWP:
    if there is no ongoing random access procedure associated with this active UL BWP and active DL BWP having same BWP ID as this active UL BWP of this serving cell:

start or restart the BWP Inactivity Timer(bwp-InactivityTimer) associated with the active DL BWP having the same BWP ID as this active UL BWP.

Handling BWP Inactivity Timer (Re)Start Wherein Single BWP Inactivity Timer is Maintained for all Active DL BWPs Associated With BWP Inactivity Timer There can be one or more active DL BWPs. Zero or one or more DL BWPs can be associated with BWP inactivity timer. Single BWP inactivity timer is maintained for all active DL BWPs associated with BWP inactivity timer.

Handling BWP Inactivity Timer (Re-)Start Method 1:
MAC entity in the UE performs the following operation for one or more activated Serving Cell (e.g., each activated Serving Cell) configured with BWP Inactivity Timer:
  if a PDCCH addressed to C-RNTI or CS-RNTI indicating downlink assignment or uplink grant is received on an active DL BWP associated with BWP inactivity timer:
    if there is no ongoing random access procedure involving any active DL BWP associated with BWP inactivity timer of this serving cell; or
    if the ongoing random access procedure involving any active DL BWP associated with BWP inactivity timer of this serving cell is successfully completed upon reception of this PDCCH addressed to C-RNTI:
      start or restart the BWP Inactivity Timer(bwp-InactivityTimer) of this serving cell.
  if a PDCCH addressed to C-RNTI or CS-RNTI indicating downlink assignment is received for an active DL BWP associated with BWP inactivity timer:
    if there is no ongoing random access procedure involving any active DL BWP associated with BWP inactivity timer of this serving cell; or
    if the ongoing random access procedure involving any active DL BWP associated with BWP inactivity timer of this serving cell is successfully completed upon reception of this PDCCH addressed to C-RNTI:
      start or restart the BWP Inactivity Timer(bwp-InactivityTimer) of this serving cell.
  if a PDCCH addressed to C-RNTI or CS-RNTI indicating uplink grant is received for an active UL BWP:
    if there is no ongoing random access procedure associated with any active DL BWP associated with BWP inactivity timer of this Serving Cell:
      start or restart the BWP Inactivity Timer(bwp-InactivityTimer) of this serving cell.

Handling BWP Inactivity Timer (Re-)Start Method 2:
MAC entity in the UE performs the following operation for one or more activated Serving Cell (e.g., each activated Serving Cell):
  if a PDCCH addressed to C-RNTI or CS-RNTI indicating downlink assignment or uplink grant is received on an active DL BWP associated with BWP inactivity timer:
    if there is no ongoing random access procedure associated with this serving cell; or
    if the ongoing random access procedure associated with this serving cell is successfully completed upon reception of this PDCCH addressed to C-RNTI:
      start or restart the BWP Inactivity Timer(bwp-InactivityTimer) of this serving cell.
  if a PDCCH addressed to C-RNTI or CS-RNTI indicating downlink assignment is received for an active DL BWP associated with BWP inactivity timer:
    if there is no ongoing random access procedure associated with this serving cell; or
    if the ongoing random access procedure associated with this serving cell is successfully completed upon reception of this PDCCH addressed to C-RNTI:
      start or restart the BWP Inactivity Timer(bwp-InactivityTimer) of this serving cell.
  if a PDCCH addressed to C-RNTI or CS-RNTI indicating uplink grant is received for an active UL BWP:
    if there is no ongoing random access procedure associated with this active UL BWP and active DL BWP having same BWP ID as this active UL BWP of this serving cell:
      start or restart the BWP Inactivity Timer(bwp-InactivityTimer) of this serving cell.

BWP Switching Operation Based on Initiation of Random Access Procedure

The random access procedure may be initiated by a PDCCH order from the base station (e.g., gNB), by the MAC entity itself, by beam failure indication from lower layer, or by an RRC. For example, the random access procedure may be initiated or performed for the following events related to the PCell:
  Initial access from RRC_IDLE;
  RRC connection re-establishment procedure;
  Handover
  DL data arrival during RRC_CONNECTED requiring random access procedure:
    E.g., when UL synchronisation status is "non-synchronised".
  UL data arrival during RRC_CONNECTED requiring random access procedure:
    E.g., based on UL synchronization status being "non-synchronized" or there being no PUCCH resources for SR available.
  For positioning purpose(s) during RRC_CONNECTED requiring random access procedure;
    E.g., based on timing advance being needed for UE positioning.
  Transition from RRC INACTIVE;
  Request for other SI (system information).

The random access procedure may also be performed on a SCell to establish time alignment for the corresponding sTAG (secondary timing advance group). In DC, the random access procedure may also be performed on at least PSCell upon SCG addition/modification, if instructed, or upon DL/UL data arrival during RRC_CONNECTED requiring random access procedure. The UE initiated random access procedure may be performed only on PSCell for SCG.

In a design of the related art, upon initiation of the random access procedure on a serving cell, if PRACH occasions are not configured for the active UL BWP of this serving cell: the UE may switch the active UL BWP to a BWP indicated by (or associated with) an initial Uplink BWP(initialUplinkBWP). Based on this serving cell being a SpCell, the UE may also switch the active DL BWP to a BWP indicated by (or associated with) an initial Downlink BWP(initialDownlinkBWP). Upon initiation of the random access procedure on a serving cell, if PRACH occasions are configured for the active UL BWP of this serving cell: if this serving cell is a SpCell and if the active DL BWP of this serving cell does not have the same BWP-ID as the active UL BWP of this serving cell, the UE may switch the active DL BWP to the DL BWP with the same BWP-ID as the active UL BWP.

In order to support multiple active BWPs the above procedure may be enhanced to address the following aspects:

PRACH occasions of which active UL BWP amongst the multiple active UL BWPs are checked by UE?
Amongst the multiple active UL BWPs, which active UL BWP is considered for switching?
Amongst the multiple active DL BWPs, which active DL BWP is considered for switching?

BWP Switching Operation Based on Initiation of Random Access Procedure Method 1

Figure 6:
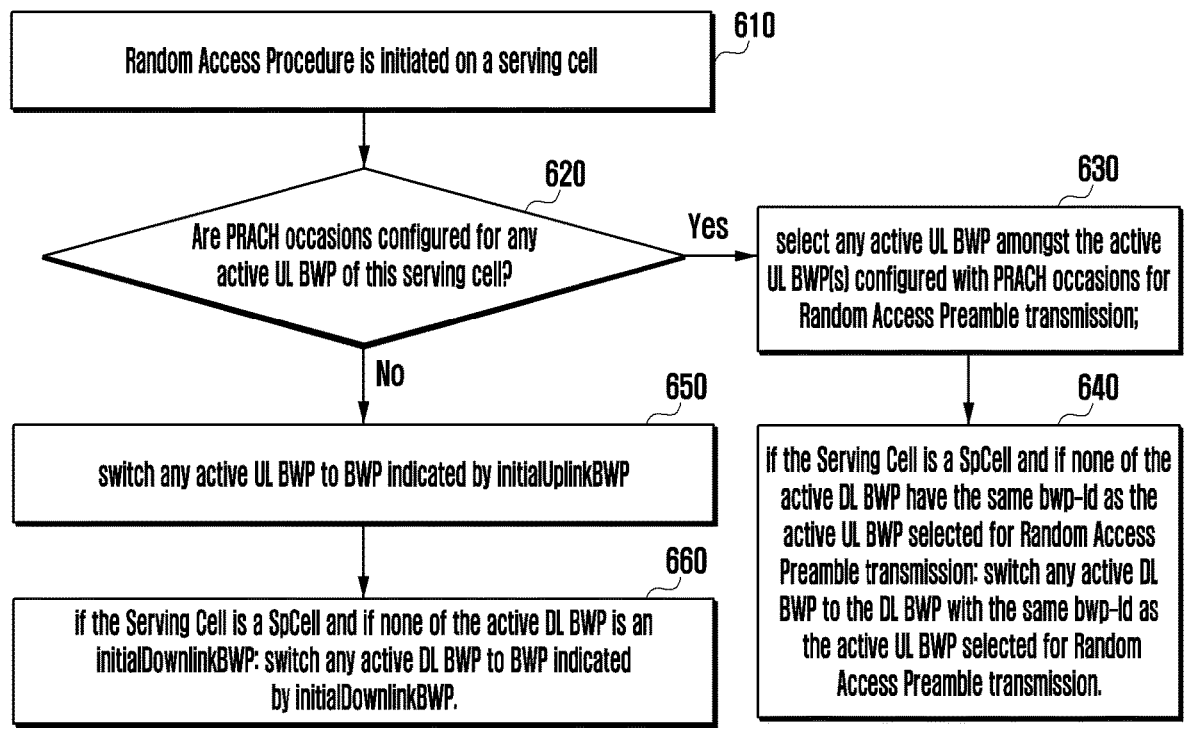
FIG. 6 illustrates an example of a method of BWP switching operation upon initiation of random access procedure according to an embodiment of the present disclosure.

FIG. 6 illustrates an example of a method of BWP switching operation upon initiation of a random access procedure according to an embodiment of the present disclosure.

Referring to FIG. 6, one method of the disclosure is illustrated. At operation 610, the random access procedure on a serving cell is initiated. The MAC entity in the UE shall (or may) for this serving cell perform the following operation:

1. At operation 620, the UE (or the MAC entity in the UE) may identify whether PRACH occasions are configured for any active UL BWP of this serving cell or not.
2. Based on identifying that PRACH occasions are not configured for any active UL BWP:
2-1) At operation 650, the UE may switch any active UL BWP to a BWP indicated by (or associated with) an initial Uplink BWP. Based on completion of the random access procedure, the UE may inform the base station (e.g., the gNB) about the active UL BWP, which the UE has switched to the initial Uplink BWP(initialUplinkBWP).
2-2) Based on the serving cell being a SpCell and none of the active DL BWP being an initial Downlink BWP(initialDownlinkBWP): at operation 660, the UE may switch any active DL BWP to a BWP indicated by (or associated with) the initial Downlink BWP(initialDownlinkBWP) (or Downlink BWP-ID). Based on completion of the random access procedure, the UE may inform the base station (e.g., gNB) about the active DL BWP, which the UE has switched to the initial Downlink BWP (or (Downlink BWP-ID).
3. Otherwise, based on PRACH occasions being configured for at least one active UL BWP:
3-1) At operation 630, the UE may select any active UL BWP amongst the active UL BWP(s) configured with PRACH occasions for random access preamble transmission. Based on the serving cell being an unlicensed cell, the UE may select the UL BWP where LBT is successful.
3-2) Based on the serving cell being a SpCell and none of the active DL BWP having the same BWP-ID as the active UL BWP selected for random access preamble transmission: at operation 640, the UE may switch any active DL BWP to the DL BWP with the same BWP-ID as the active UL BWP selected for random access preamble transmission. Based on completion of the random access procedure, the UE may inform (or notify) the base station (e.g., gNB) about the active DL BWP which the UE has switched to DL BWP with the same BWP-ID as the active UL BWP selected for random access preamble transmission.

In an alternate embodiment of the disclosure, based on initiation of the random access procedure on a serving cell, the MAC entity in the UE shall (or may) for this serving cell perform the following operation:

1. At operation 620, the UE (or the MAC entity in the UE) may identify whether PRACH occasions are configured for any active UL BWP of this serving cell or not.

2. Based on PRACH occasions not being configured for any active UL BWP:
2-1) At operation 650, the UE may switch an active UL BWP with a smallest BWP-ID amongst all active UL BWPs to a BWP indicated by an initial Uplink BWP (initialUplinkBWP);
2-2) Based on the serving cell being a SpCell and none of the active DL BWP being an initial Downlink BWP(initialDownlinkBWP): at operation 660, the UE may switch an active DL BWP with a smallest BWP-ID amongst all active DL BWPs to a BWP indicated by an initial Downlink BWP.
3. Otherwise, based on PRACH occasions being configured for at least one active UL BWP:
3-1) At operation 630, the UE may select any active UL BWP amongst the active UL BWP(s) configured with PRACH occasions for random access preamble transmission; Based on the serving cell being an unlicensed cell, the UE may select the UL BWP where LBT is successful.
3-2) If the serving cell is a SpCell and if none of the active DL BWP have the same bwp-Id as the active UL BWP selected for Random Access Preamble transmission: at operation 640, the UE switches an active DL BWP with smallest BWP-Id amongst all active DL BWPs to the DL BWP with the same bwp-Id as the active UL BWP selected for random access preamble transmission.

In an alternate embodiment of the proposed invention, upon initiation of the random access procedure on a serving cell, the MAC entity in the UE shall for this serving cell perform the following operation:

1. At operation 620, the UE (or the MAC entity in the UE) determines if PRACH occasions are configured for any active UL BWP of this serving cell or not.
2. If PRACH occasions are not configured for any active UL BWP:
2-1) At operation 650, the UE switches an active UL BWP with largest BWP-Id amongst all active UL BWPs to BWP indicated by initialUplinkBWP;
2-2) If the serving cell is a SpCell and if none of the active DL BWP is an initialDownlinkBWP: at operation 660, the UE switches an active DL BWP with largest BWP-Id amongst all active DL BWPs to BWP indicated by initialDownlinkBWP.
3. Else if PRACH occasions are configured for at least one active UL BWP:
3-1) At operation 630, the UE selects any active UL BWP amongst the active UL BWP(s) configured with PRACH occasions for random access preamble transmission; If serving cell is an unlicensed cell, the UE may select the UL BWP where LBT is successful.
3-2) If the serving cell is a SpCell and if none of the active DL BWP have the same bwp-Id as the active UL BWP selected for random access preamble transmission: at operation 640, the UE switches an active DL BWP with largest BWP-Id amongst all active DL BWPs to the DL BWP with the same bwp-Id as the active UL BWP selected for random access preamble transmission.

In an alternate embodiment of the proposed invention, upon initiation of the random access procedure on a serving cell, the MAC entity in the UE shall for this serving cell perform the following operation:

1. At operation 620, the UE (or the MAC entity in the UE) determines if PRACH occasions are configured for any active UL BWP of this serving cell or not.
2. If PRACH occasions are not configured for any active UL BWP:

2-1) At operation 650, the UE switches the first active UL BWP in list of configured UL BWPs to BWP indicated by initialUplinkBWP;
2-2) If the serving cell is a SpCell and if none of the active DL BWP is an initialDownlinkBWP: at operation 660, the UE switches first active DL BWP in list of configured DL BWPs to BWP indicated by initialDownlinkBWP.
3. Else if PRACH occasions are configured for at least one active UL BWP:
3-1) At operation 630, the UE selects any active UL BWP amongst the active UL BWP(s) configured with PRACH occasions for random access preamble transmission; If serving cell is an unlicensed cell, the UE may select the UL BWP where LBT is successful.
3-2) If the serving cell is a SpCell and if none of the active DL BWP have the same bwp-Id as the active UL BWP selected for random access preamble transmission: at operation 640, the UE switches first active DL BWP in list of configured DL BWPs to the DL BWP with the same bwp-Id as the active UL BWP selected for random access preamble transmission.

In an alternate embodiment of the proposed invention, upon initiation of the random access procedure on a serving cell, the MAC entity in the UE shall for this serving cell perform the following operation:
1. At operation 620, the UE (or the MAC entity in the UE) determines if PRACH occasions are configured for any active UL BWP of this serving cell or not.
2. If PRACH occasions are not configured for any active UL BWP:
2-1) At operation 650, the UE switches the last active UL BWP in list of configured UL BWPs to BWP indicated by initialUplinkBWP;
2-2) If the serving cell is a SpCell and if none of the active DL BWP is an initialDownlinkBWP: at operation 660, the UE switches last active DL BWP in list of configured DL BWPs to BWP indicated by initialDownlinkBWP.
3. Else if PRACH occasions are configured for at least one active UL BWP:
3-1) At operation 630, the UE selects any active UL BWP amongst the active UL BWP(s) configured with PRACH occasions for random access preamble transmission; If serving cell is an unlicensed cell, the UE may select the UL BWP where LBT is successful.
3-2) If the serving cell is a SpCell and if none of the active DL BWP have the same bwp-Id as the active UL BWP selected for random access preamble transmission: at operation 640, the UE switches last active DL BWP in list of configured DL BWPs to the DL BWP with the same bwp-Id as the active UL BWP selected for random access preamble transmission.

BWP Switching Operation Based on Initiation of Random Access Procedure Method 2

Figure 7:
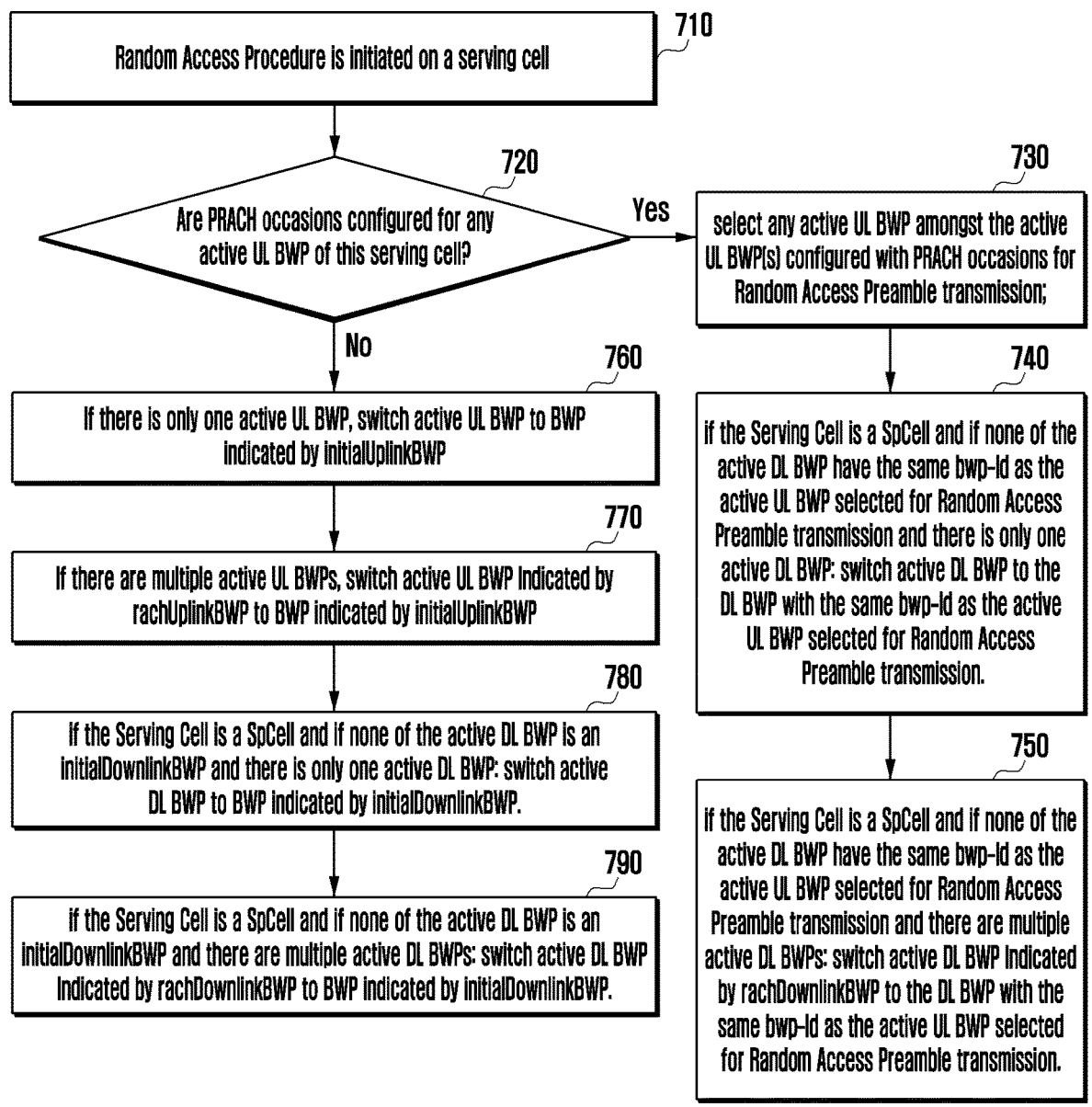
FIG. 7 illustrates another example of a method of BWP switching operation upon initiation of random access procedure according to an embodiment of the present disclosure.

FIG. 7 illustrates another example of a method of BWP switching operation upon initiation of random access procedure according to an embodiment of the present disclosure.

Referring to FIG. 7, another method of the disclosure is illustrated. At operation 710, the random access procedure on a serving cell is initiated. The MAC entity in the UE shall for this serving cell perform the following operation:
1. At operation 720, the UE (or the MAC entity in the UE) determines if PRACH occasions are configured for any active UL BWP of this serving cell or not.

2. If PRACH occasions are not configured for any active UL BWP:
2-1) The UE determines if there are multiple active UL BWPs or not. If there are multiple active UL BWPs: at operation 770, the UE switches active UL BWP indicated by rachUplinkBWP to BWP indicated by initialUplinkBWP. If there is only one active UL BWP: at operation 760, the UE switches the active UL BWP to BWP indicated by initialUplinkBWP. rachUplinkBWP is signalled by the gNB to the UE in the dedicated RRC signaling message.
2-2) If the serving cell is a SpCell and if none of the active DL BWP is an initialDownlinkBWP and if there are multiple active DL BWPs: at operation 790, the UE switches active DL BWP indicated by rachDownlinkBWP to BWP indicated by initialDownlinkBWP. rachDownlinkBWP is signalled by the gNB to the UE in the dedicated RRC signaling message.
2-3) If the serving cell is a SpCell and if none of the active DL BWP is an initialDownlinkBWP and if there is only one active DL BWPs: at operation 780, the UE switches the active DL BWP to BWP indicated by initialDownlinkBWP.
3—Else if PRACH occasions are configured for at least one active UL BWP:
3-1) At operation 730, the UE selects any active UL BWP amongst the active UL BWP(s) configured with PRACH occasions for random access preamble transmission; If serving cell is an unlicensed cell, the UE may select the UL BWP where LBT is successful.
3-2) If the serving cell is a SpCell and if none of the active DL BWP have the same bwp-Id as the active UL BWP selected for random access preamble transmission and if there multiple active DL BWPs: at operation 750, the UE switches active DL BWP indicated by rachDownlinkBWP to the DL BWP with the same bwp-Id as the active UL BWP selected for random access preamble transmission.
3-3) If the serving cell is a SpCell and if none of the active DL BWP have the same bwp-Id as the active UL BWP selected for random access preamble transmission and if there is only one active DL BWP: at operation 740, the UE switches the active DL BWP to the DL BWP with the same bwp-Id as the active UL BWP selected for random access preamble transmission.

BWP Switching Operation Based on Initiation of Random Access Procedure Method 3

Figure 8:
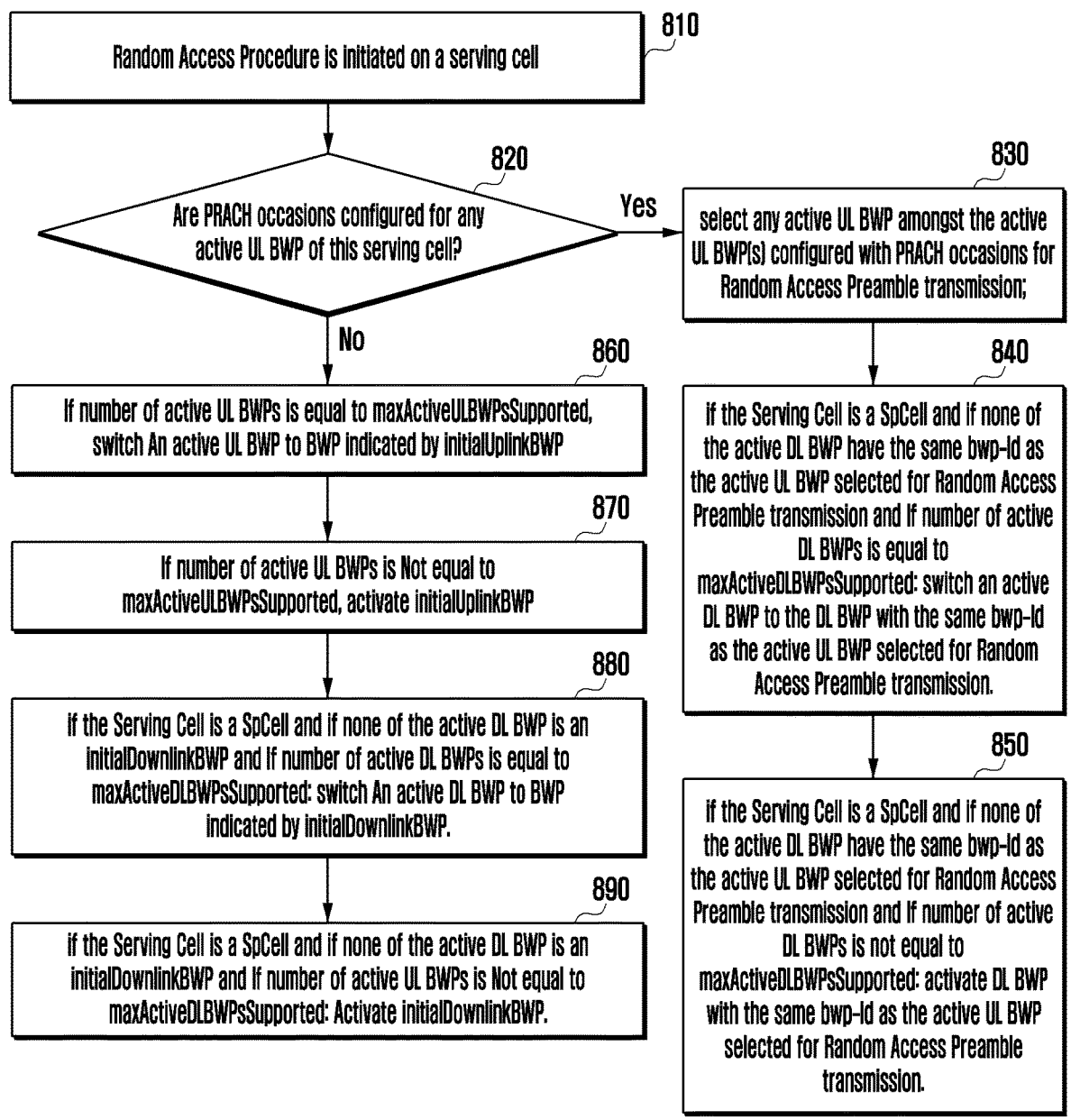
FIG. 8 illustrates another example of a method of BWP switching operation upon initiation of random access procedure according to an embodiment of the present disclosure.

FIG. 8 illustrates another example of a method of BWP switching operation upon initiation of random access procedure according to an embodiment of the present disclosure.

Referring to FIG. 8, another method of the proposed invention as illustrated. At operation 810, the random access procedure on a serving cell is initiated. The MAC entity in the UE shall for this serving cell perform the following operation:
1. At operation 820, the UE (or the MAC entity in the UE) determines if PRACH occasions are configured for any active UL BWP of this serving cell or not.
2. If PRACH occasions are not configured for any active UL BWP:
2-1) The UE determines if number of active UL BWPs is equal to maxActiveULBWPsSupported or not. If number of active UL BWPs is equal to maxActiveULBWPsSupported: at operation 860, the UE switches an active UL BWP to BWP indicated by initialUplinkBWP. The active UL BWP selected for switching can be the a) a first active UL BWP amongst the configured UL BWPs or b) a last active UL BWP amongst the configured UL BWPs or c) an active UL BWP with smallest BWP-Id amongst all the active UL BWPs or d) an active UL BWP with largest BWP-Id amongst all the active UL BWPs or e) an active UL BWP indicated by rachUplinkBWP wherein rachUplinkBWP is signalled by the gNB to the UE in the dedicated RRC signaling message. If number of active UL BWPs is not equal to maxActiveULBWPs Supported, at operation 870, the UE activates initialUplinkBWP.

2-2) If the serving cell is a SpCell and if none of the active DL BWP is an initialDownlinkBWP and if number of active DL BWPs is equal to maxActiveDLBWPsSupported: at operation 880, the UE switches an active DL BWP to BWP indicated by initialDownlinkBWP.

The active DL BWP selected for switching can be the a) a first active DL BWP amongst the configured DL BWPs or b) a last active DL BWP amongst the configured DL BWPs or c) an active DL BWP with smallest BWP-Id amongst all the active DL BWPs or d) an active DL BWP with largest BWP-Id amongst all the active DL BWPs or e) an active DL BWP indicated by rachDownlinkBWP wherein rachDownlinkBWP is signalled by the gNB to the UE in dedicated RRC signaling message.

2-3) If the serving cell is a SpCell and if none of the active DL BWP is an initialDownlinkBWP and if number of active DL BWPs is not equal to maxActiveDLBWPsSupported: at operation 890, the UE activates initialDownlinkBWP.

3—Else if PRACH occasions are configured for at least one active UL BWP:

3-1) At operation 830, the UE selects any active UL BWP amongst the active UL BWP(s) configured with PRACH occasions for random access preamble transmission; If the serving cell is an unlicensed cell, the UE may select the UL BWP where LBT is successful.

3-2) If the serving cell is a SpCell and if none of the active DL BWP have the same bwp-Id as the active UL BWP selected for random access preamble transmission and if number of the active DL BWPs is equal to maxActiveDLBWPsSupported: at operation 840, the UE switches an active DL BWP to the DL BWP with the same bwp-Id as the active UL BWP selected for random access preamble transmission. The active DL BWP selected for switching can be the a) a first active DL BWP amongst the configured DL BWPs or b) a last active DL BWP amongst the configured DL BWPs or c) an active DL BWP with smallest BWP-Id amongst all the active DL BWPs or d) an active DL BWP with largest BWP-Id amongst all the active DL BWPs or e) an active DL BWP indicated by rachDownlinkBWP wherein rachDownlinkBWP is signalled by the gNB to the UE in dedicated RRC signaling message.

3-3) If the serving cell is a SpCell and if none of the active DL BWP have the same bwp-Id as the active UL BWP selected for random access preamble transmission and if number of the active DL BWPs is not equal to maxActiveDLBWPsSupported: at operation 850, the UE activates DL BWP with the same bwp-Id as the active UL BWP selected for random access preamble transmission.

In an embodiment, maxActiveDLBWPsSupported and maxActiveULBWPsSupported can be just one parameter maxActiveBWPsSupported.

In the above methods for random access procedure initiated on the SpCell, the RAR (random access response) is received in the active DL BWP having same BWP-Id as the UL BWP on which random access preamble is transmitted. For the random access procedure initiated on the SCell, the UE monitors the active DL BWP of the SpCell for receiving the RAR. In case there are multiple active DL BWPs in the SpCell:

1) In one embodiment, the UE may monitor the active DL BWP of the SpCell which has the same BWP-ID as the UL BWP of the SCell on which the random access preamble is transmitted
2) In another embodiment, the UE may monitor any active DL BWP of the SpCell
3) In another embodiment, the UE may monitor all the active DL BWPs of the SpCell
4) In another embodiment, the UE may monitor the first active DL BWP amongst the configured DL BWPs of the SpCell
5) In another embodiment, the UE may monitor the last active DL BWP amongst the configured DL BWPs of the SpCell
6) In another embodiment, the UE may monitor the active DL BWP with smallest BWP-Id amongst all the active DL BWPs of the SpCell
7) In another embodiment, the UE may monitor the active DL BWP with largest BWP-Id amongst all the active DL BWPs of the SpCell
8) In another embodiment, the UE may monitor the active DL BWP of the SpCell indicated by rachDownlinkBWP wherein rachDownlinkBWP is signalled by the gNB to the UE in dedicated the RRC signaling message.

BWP Switching Command Handling

In a design, based on the MAC entity receiving(obtaining) a PDCCH for switching an active BWP of a serving cell, BWP switching may be performed based on there being no ongoing Random Access Procedure associated with this serving cell. If a random access procedure is initiated on SpCell, the random access procedure is associated with a Special Cell (SpCell). Based on the random access procedure being initiated on an SCell, the random access procedure may be associated with that SCell and the SpCell.

In a case of multiple active BWPs, this operation is inefficient as all active BWPs of a serving cell associated with the random access procedure are not involved in the random access procedure.

In one method of the disclosure, based on the MAC entity obtaining a PDCCH for switching an active BWP of a serving cell, the MAC entity shall (or may) for this active BWP:

based on there being no ongoing random access procedure associated with the BWP to be switched on this serving cell; or based on the ongoing random access procedure associated with the BWP to be switched on this serving cell being successfully completed based on obtaining of this PDCCH addressed to C-RNTI:

perform BWP switching to a BWP indicated by the PDCCH.

The active UL BWP on which RA preamble is transmitted is considered to be associated with the random access procedure. The active DL BWP on which the RAR (random access response) is obtained may be considered to be associated with the random access procedure.

Figure 9:
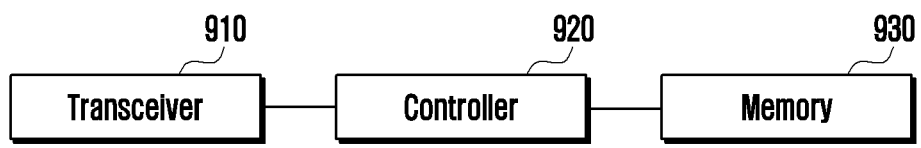
FIG. 9 is a block diagram of a base station according to an embodiment of the disclosure.

FIG. 9 is a block diagram of a base station according to an embodiment of the disclosure.

Referring to FIG. 9, a base station includes a transceiver 910 (communication interface, e.g., a network communication interface), a controller 920 and a memory 930. The controller 920 may refer to a circuitry, an ASIC, an FPGA, or at least one processor. The transceiver 910, the controller 920 and the memory 930 are configured to perform the operations of the gNB illustrated in the FIGS., e.g., FIGS. 1 to 8, or as otherwise described above. Although the transceiver 910, the controller 920 and the memory 930 are shown as separate entities, they may be realized as a single entity and integrated onto a single chip. The transceiver 910, the controller 920 and the memory 930 may also be electrically connected to or coupled with each other.

The transceiver 910 may transmit and obtain (or receive) signals to and from other network entities, e.g., a terminal.

The controller 920 may control the base station (e.g., gNB) to perform functions according to the embodiments described above.

In an embodiment, the operations of the base station may be implemented using the memory 930 storing corresponding program code or code sets. Specifically, the base station may be equipped with the memory 930 to store program code or code sets implementing desired operations. To perform the desired operations, the controller 920 may read and execute the program code or code sets stored in the memory 930 by using a processor or a central processing unit (CPU), as the controller. The processor may include one processor or two or more processors, and the memory may include one memory or two or more memories.

Figure 10:
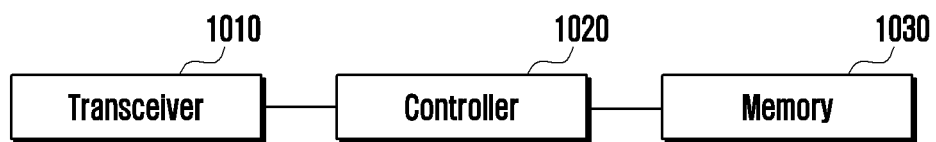
FIG. 10 is a block diagram of a terminal according to an embodiment of the disclosure.

FIG. 10 is a block diagram of a terminal according to an embodiment of the disclosure.

Referring to FIG. 10, a terminal may include a transceiver 1010 (communication interface, e.g., a network communication interface), a controller 1020 (e.g., processor or CPU) and a memory 1030. The controller 1020 may refer to a circuitry, an Application Specific Integrated Circuit (ASIC), an FPGA, or at least one processor. The transceiver 1010, the controller 1020 and the memory 1030 may be configured to perform the operations of one or more of the UEs illustrated in the FIGS., e.g., FIGS. 1 to 8, or as otherwise described above. Although the transceiver 1010, the controller 1020 and the memory 1030 are shown as separate entities, they may be integrated onto a single chip. The transceiver 1010, the controller 1020 and the memory 1030 may also be electrically connected to or coupled with each other.

The transceiver 1010 may transmit and receive (or transmit and obtain) signals to and from other network entities, e.g., a base station.

The controller 1020 may control the UE to perform functions according to the embodiments described above.

In an embodiment, the operations of the terminal may be implemented using the memory 1030 storing corresponding program code (e.g., instructions code). Specifically, the terminal may be equipped with the memory 1030 to store program code or code sets implementing desired operations. To perform the desired operations, the controller 1020 may read and execute the program code or code sets stored in the memory 1030 by using a processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a terminal in a wireless communication system, the method comprising:

receiving, from a base station, a configuration message for multiple active downlink (DL) bandwidth parts (BWPs) of a serving cell;

identifying that a BWP inactivity timer has expired based on the configuration message, the BWP inactivity timer corresponding to a first DL BWP being activated in the serving cell;

identifying whether the first DL BWP is an only activated DL BWP of the serving cell;

identifying whether an indicator indicating a BWP switching upon the BWP inactivity timer expiring is configured in the configuration message in case that the first DL BWP is not the only activated DL BWP of the serving cell;

switching the first DL BWP to a default DL BWP or an initial DL BWP in case that the first DL BWP is not the only activated DL BWP of the serving cell and the indicator is configured in the configuration message; and receiving, from the base station, a downlink signal on the default DL BWP or the initial DL BWP and a second DL BWP being activated in the serving cell, wherein the indicator indicating the BWP switching upon the BWP inactivity timer expiring is 1 bit.

2. The method of claim 1, further comprising:
deactivating the first DL BWP, in case that the first DL BWP is not the only activated DL BWP of the serving cell and the indicator is not configured in the configuration message.

3. The method of claim 1, wherein the identifying of whether the first DL BWP is the only activated DL BWP of the serving cell further comprises:
identifying whether at least one BWP inactivity timer corresponding respectively to at least one DL BWP of the serving cell other than the first DL BWP is running.

4. The method of claim 3, wherein the first DL BWP is deactivated in case that the at least one BWP inactivity timer corresponding respectively to the at least one DL BWP of the serving cell other than the first DL BWP is running and the indicator is not configured in the configuration message.

5. The method of claim 1, further comprising:
in case that the multiple active DL BWPs are associated with the BWP inactivity timer and the BWP inactivity timer expires, deactivating the multiple active DL BWPs; and
activating the default DL BWP or the initial DL BWP.

6. The method of claim 1, wherein the configuration message includes list information of identifiers of DL BWPs for the multiple active DL BWPs or bitmap information corresponding to the DL BWPs for the multiple active DL BWPs.

7. The method of claim 1, further comprising:
receiving, from the base station, control information on a physical downlink control channel (PDCCH), the control information indicating a downlink assignment associated with the first DL BWP; and
starting the BWP inactivity timer corresponding to the first DL BWP in case that there is no ongoing random access procedure.

8. The method of claim 1, further comprising:
determining whether a physical random access channel (PRACH) occasion is configured for at least one active uplink (UL) BWP of the serving cell;
in case that the PRACH occasion is not configured for the at least one active UL BWP of the serving cell, switching a predetermined active UL BWP of the at least one active UL BWP to an initial UL BWP; and in case that the serving cell is a special cell (SpCell) and none of at least one active DL BWP is the initial DL BWP, switching a predetermined active DL BWP of the at least one active DL BWP to the initial DL BWP.

9. The method of claim 8, further comprising:
in case that the PRACH occasion is configured for an active UL BWP of the at least one active UL BWP, selecting the active UL BWP configured with the PRACH occasion for random access preamble transmission; and
in case that the serving cell is the SpCell and none of the at least one active DL BWP has a same BWP identifier as the selected active UL BWP, switching the predetermined active DL BWP of the at least one active DL BWP to the initial DL BWP.

10. The method of claim 8, wherein the switching the predetermined active UL BWP to the initial UL BWP comprises:
in case that a number of active UL BWPs is equal to a number of supported maximum UL BWPs, switching the predetermined active UL BWP of the at least one active UL BWP to the initial UL BWP; and
in case that the number of active UL BWPs is smaller than the number of supported maximum UL BWPs, activating the initial UL BWP, and
wherein the switching the predetermined active DL BWP to the initial DL BWP comprises:
in case that a number of active DL BWPs is equal to a number of supported maximum DL BWPs, switching the predetermined active DL BWP of the at least one active DL BWP to the initial DL BWP; and
in case that the number of active DL BWPs is smaller than the number of supported maximum DL BWPs, activating the initial DL BWP.

11. A terminal in a wireless communication system, the terminal comprising:
a transceiver; and
a controller configured to:
receive, from a base station via the transceiver, a configuration message for multiple active downlink (DL) bandwidth parts (BWPs) of a serving cell,
identify that a BWP inactivity timer has expired based on the configuration message, the BWP inactivity timer corresponding to a first DL BWP being activated in the serving cell,
identify whether the first DL BWP is an only activated DL BWP of the serving cell;
identify whether an indicator indicating a BWP switching upon the BWP inactivity timer expiring is configured in the configuration message in case that the first DL BWP is not the only activated DL BWP of the serving cell,
switch the first DL BWP to a default DL BWP or an initial DL BWP in case that the first DL BWP is not the only activated DL BWP of the serving cell and the indicator is configured in the configuration message, and
receive, from the base station via the transceiver, a downlink signal on the default DL BWP or the initial DL BWP and a second DL BWP being activated in the serving cell,
wherein the indicator indicating the BWP switching upon the BWP inactivity timer expiring is 1 bit.

12. The terminal of claim 11, wherein the controller is further configured to:

deactivate the first DL BWP in case that the first DL BWP is not the only activated DL BWP of the serving cell and the indicator is not configured in the configuration message.

13. The terminal of claim 11, wherein the controller is further configured to:
identify whether at least one BWP inactivity timer corresponding respectively to at least one DL BWP of the serving cell other than the first DL BWP is running.

14. The terminal of claim 13, wherein the first DL BWP is deactivated in case that the at least one BWP inactivity timer corresponding respectively to the at least one DL BWP of the serving cell other than the first DL BWP is running and the indicator is not configured in the configuration message.

15. The terminal of claim 11, wherein the controller is further configured to:
in case that the multiple active DL BWPs are associated with the BWP inactivity timer and the BWP inactivity timer expires, deactivate the multiple active DL BWPs, and
activate the default DL BWP or the initial DL BWP.

16. The terminal of claim 11, wherein the configuration message includes list information of identifiers of DL BWPs for the multiple active DL BWPs or bitmap information corresponding to the DL BWPs for the multiple active DL BWPs.

17. The terminal of claim 11, wherein the controller is further configured to:
receive, from the base station via the transceiver, control information on a physical downlink control channel (PDCCH), the control information indicating a downlink assignment associated with the first DL BWP, and
start the BWP inactivity timer corresponding to the first DL BWP in case that there is no ongoing random access procedure.

18. The terminal of claim 11, wherein the controller is further configured to:
determine whether a physical random access channel (PRACH) occasion is configured for at least one active uplink (UL) BWP of the serving cell,
in case that the PRACH occasion is not configured for the at least one active UL BWP of the serving cell, switch a predetermined active UL BWP of the at least one active UL BWP to an initial UL BWP, and
in case that the serving cell is a special cell (SpCell) and none of at least one active DL BWP is the initial DL BWP, switch a predetermined active DL BWP of the at least one active DL BWP to the initial DL BWP.

19. The terminal of claim 18, wherein the controller is further configured to:
in case that the PRACH occasion is configured for an active UL BWP of the at least one active UL BWP, select the active UL BWP configured with the PRACH occasion for random access preamble transmission, and
in case that the serving cell is the SpCell and none of the at least one active DL BWP has a same BWP identifier as the selected active UL BWP, switch the predetermined active DL BWP of the at least one active DL BWP to the initial DL BWP.

20. The terminal of claim 18, wherein the controller is further configured to:
in case that a number of active UL BWPs is equal to a number of supported maximum UL BWPs, switch the predetermined active UL BWP of the at least one active UL BWP to the initial UL BWP, in case that the number of active UL BWPs is smaller than the number of supported maximum UL BWPs, activate the initial UL BWP, in case that a number of active DL BWPs is equal to a number of supported maximum DL BWPs, switch the predetermined active DL BWP of the at least one active DL BWP to the initial DL BWP, and in case that the number of active DL BWPs is smaller than the number of supported maximum DL BWPs, activate the initial DL BWP.

* * * * *